US011842063B2

(12) United States Patent
Ben Romdhane et al.

(10) Patent No.: US 11,842,063 B2
(45) Date of Patent: Dec. 12, 2023

(54) DATA PLACEMENT AND RECOVERY IN THE EVENT OF PARTITION FAILURES

(71) Applicant: eBay Inc., San Jose, CA (US)

(72) Inventors: Sami Ben Romdhane, Los Altos, CA (US); Sakib Md Bin Malek, San Jose, CA (US); Tariq Mustafa, Fremont, CA (US); Jiankun Yu, Pleasanton, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/704,978

(22) Filed: Mar. 25, 2022

(65) Prior Publication Data

US 2023/0305726 A1    Sep. 28, 2023

(51) Int. Cl.
*G06F 12/00* (2006.01)
*G06F 3/06* (2006.01)

(52) U.S. Cl.
CPC ............ *G06F 3/0644* (2013.01); *G06F 3/067* (2013.01); *G06F 3/0619* (2013.01); *G06F 3/0659* (2013.01)

(58) Field of Classification Search
None
See application file for complete search history.

(56) References Cited

U.S. PATENT DOCUMENTS

| 9,223,644 | B1 * | 12/2015 | Schrock | G06F 11/0793 |
| 2007/0011361 | A1 * | 1/2007 | Okada | G06F 3/0656 |
| | | | | 710/8 |
| 2007/0067666 | A1 * | 3/2007 | Ishikawa | G06F 11/1092 |
| | | | | 714/6.21 |

(Continued)

FOREIGN PATENT DOCUMENTS

| CN | 104054076 B | 11/2017 |
| CN | 109995813 B | 2/2021 |

(Continued)

OTHER PUBLICATIONS

Weil et al., "CRUSH: Controlled, Scalable, Decentralized Placement of Replicated Data," SC '06: Proceedings of the 2006 ACM/IEEE Conference on Supercomputing, Nov. 11-17, 2006, internet download: https://ceph.com/assets/pdfs/weil-crush-sc06.pdf, 12 pgs.

(Continued)

*Primary Examiner* — Daniel D Tsui
(74) *Attorney, Agent, or Firm* — SCHWEGMAN LUNDBER & WOESSNER, P.A.

(57) ABSTRACT

Software defined storage service (SDS) provides users with remote data volumes spread across multiple storage nodes across multiple failure domains. A distributed volume may be spread across replicas (e.g., failure domains), each replica having a number of partitions stored on storage nodes associated with a particular failure domain. In the event of a node failure, a partition stored on the failed node may be dynamically moved and remapped to another node in the same failure domain or within another failure domain that is different from a failure domain that includes a partition that is complementary to the partition stored on the failed node. The partition move and remapping may be transparent to a user. A partition move may occur while a distributed volume is in use by a client device or in an idle (e.g., offline) mode.

15 Claims, 13 Drawing Sheets

(56) References Cited

U.S. PATENT DOCUMENTS

| | | | | |
|---|---|---|---|---|
| 2018/0357141 A1* | 12/2018 | Agombar | ............ | G06F 11/2089 |
| 2020/0401316 A1 | 12/2020 | Hankins et al. | | |

FOREIGN PATENT DOCUMENTS

| | | |
|---|---|---|
| EP | 3015998 B1 | 3/2018 |
| WO | WO-2013091212 A1 | 6/2013 |
| WO | WO-2013117002 A1 | 8/2013 |

OTHER PUBLICATIONS

Brinkmann et al., "Efficient, Distributed Data Placement Strategies for Storage Area Networks (extended abstract)," SPAA '00: Proceedings of the Twelfth Annual ACM Symposium on Parallel Algorithms and Architectures, Jul. 9-13, 2000, internet download: http://www.cs.ucf.edu/~jwang/papers/dsan.pdf, 10 pgs.

Kubernetes, "Persistent Volumes," internet download: https://kubernetes.io/docs/concepts/storage/persistent-volumes/#retain, last modified Feb. 15, 2022, 18 pgs.

Perez, "Launching a Pod Mounting an Existing EBS Volume in K8s," Published in Pablo Perez, Oct. 31, 2018, internet download: https://medium.com/pablo-perez/launching-a-pod-with-an-existing-ebs-volume-mounted-in-k8s-7b5506fa7fa3, 5 pgs.

CSI-DigitalOcean, "Use an Existing Volume," DigitalOcean Block Storage document, internet download: https://github.com/digitalocean/csi-digitalocean/blob/master/examples/kubernetes/pod-single-existing-volume/README.md, download date Mar. 25, 2022, 4 pgs.

Kubernetes, "Using Preexisting Persistent Disks as PersistentVolumes," Google Kubernetes Engine (GKE) Documentation, https://cloud.google.com/kubernetes-engine/docs/how-to/persistent-volumes/preexisting-pd, last updated Mar. 23, 2022, 10 pgs.

* cited by examiner

DATA PLACEMENT AND RECOVERY IN THE EVENT OF PARTITION FAILURES

FIELD OF TECHNOLOGY

The present disclosure relates generally to database systems and data processing, and more specifically to data placement and recovery in the event of partition failures.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). Computer networks permit the transport of data between interconnected computers. Techniques for data storage using a software designed storage service may be improved.

SUMMARY

A method for data storage is described is described. The method may include storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume, detecting, by at least one processor, failure of a first node of the set of multiple nodes in a first domain of the at least two domains, moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition, and transmitting, to the compute node, a mapping for the distributed volume indicating that the first partition is stored on the second node.

An apparatus for data storage is described is described. The apparatus may include a processor, memory coupled with the processor, and instructions stored in the memory. The instructions may be executable by the processor to cause the apparatus to store, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume, detect, by at least one processor, failure of a first node of the set of multiple nodes in a first domain of the at least two domains, move a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition, and transmit, to the compute node, a mapping for the distributed volume indicating that the first partition is stored on the second node.

Another apparatus for data storage is described is described. The apparatus may include means for storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume, means for detecting, by at least one processor, failure of a first node of the set of multiple nodes in a first domain of the at least two domains, means for moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition, and means for transmitting, to the compute node, a mapping for the distributed volume indicating that the first partition is stored on the second node.

A non-transitory computer-readable medium storing code for data storage is described is described. The code may include instructions executable by a processor to store, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume, detect, by at least one processor, failure of a first node of the set of multiple nodes in a first domain of the at least two domains, move a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition, and transmit, to the compute node, a mapping for the distributed volume indicating that the first partition is stored on the second node.

Some examples of the method, apparatuses, and non-transitory computer-readable medium described herein may further include operations, features, means, or instructions for receiving, from the compute node, a read or write command for data included in the first partition based on the mapping.

In some examples of the method, apparatuses, and non-transitory computer-readable medium described herein, moving the first partition to the second node may include operations, features, means, or instructions for copying data from the first partition stored on the first node to the second node.

In some examples of the method, apparatuses, and non-transitory computer-readable medium described herein, moving the first partition to the second node may include operations, features, means, or instructions for copying data from a second partition stored on a third node in the second domain to the second node, where the second partition corresponds to the first partition.

In some examples of the method, apparatuses, and non-transitory computer-readable medium described herein, detecting failure of the first node may include operations, features, means, or instructions for receiving an indication of failure of the first node from a user interface.

Some examples of the method, apparatuses, and non-transitory computer-readable medium described herein may further include operations, features, means, or instructions for receiving operations metrics from an access manager associated with the first node, and where detecting failure of the first node may be based on the operations metrics.

In some examples of the method, apparatuses, and non-transitory computer-readable medium described herein, the operations metrics include an amount of traffic associated with the first node and detecting failure of the first node may be based on the amount of traffic associated with the first node exceeding a threshold.

In some examples of the method, apparatuses, and non-transitory computer-readable medium described herein, the operations metrics include a down time associated with the first node and detecting failure of the first node may be based on the down time associated with the first node exceeding a threshold.

In some examples of the method, apparatuses, and non-transitory computer-readable medium described herein, transmitting the mapping may include operations, features, means, or instructions for indicating a volume identifier, a first partition identifier associated with the first partition stored on the first node, and a second partition identifier associated with the second node.

DETAILED DESCRIPTION

Figure 1:
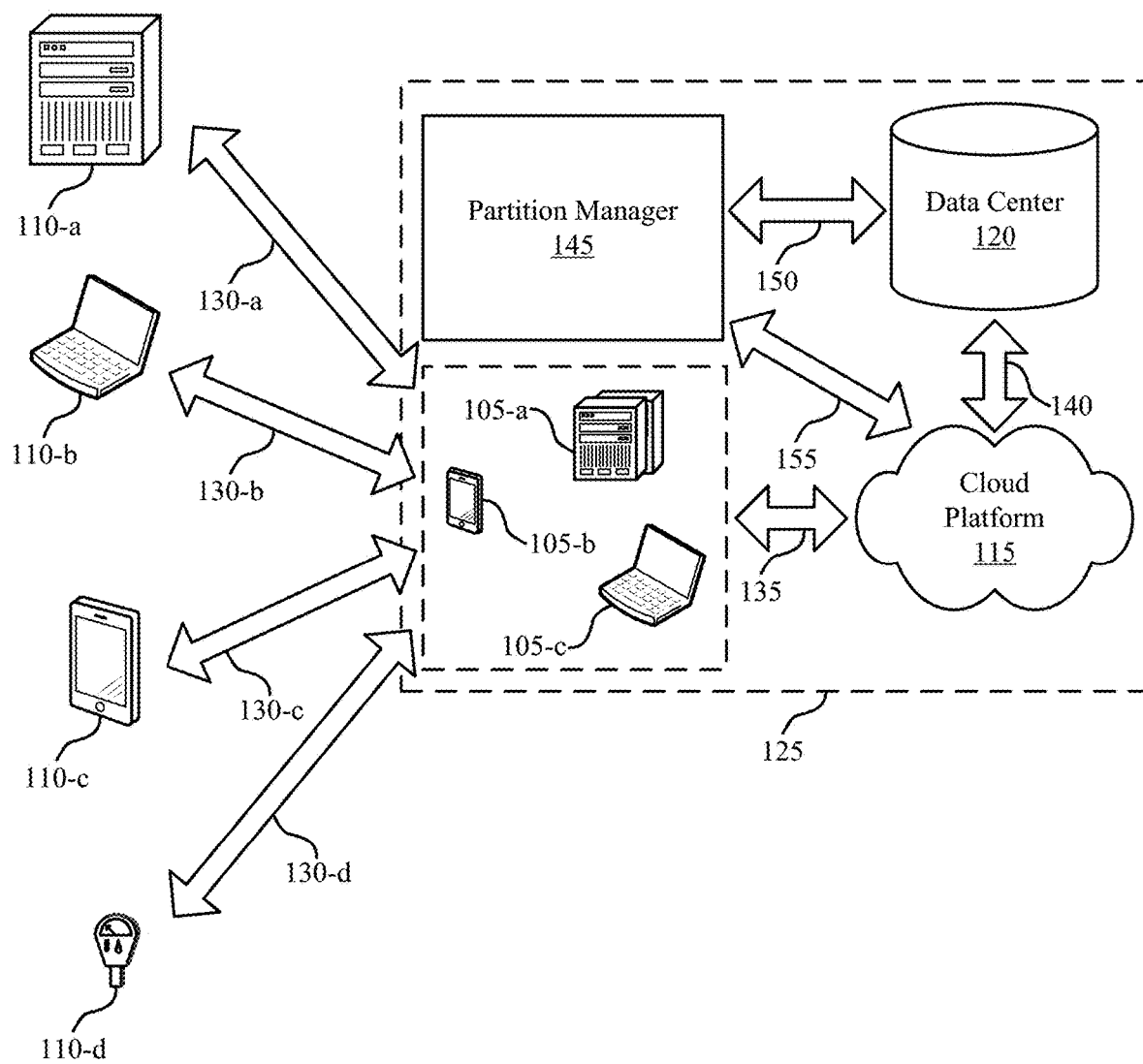
FIG. 1 illustrates an example of a data storage system that supports data placement and recovery in the event of partition failures in accordance with aspects of the present disclosure.

Software defined storage service (SDS) provides users with remote data volumes spread across multiple storage nodes across multiple failure domains. A node may be a Kubernetes (K8s) pod running on a Kubernetes node, and a K8s node may have several SDS storage pods running. For example, a platform of an online marketplace may use SDS. In an example, a user volume may be spread across two replicas (e.g., failure domains), each replica having a number of partitions on different storage nodes. A failure domain may be a logical set of storage nodes (which may each be accessed and managed by one or more access manager) on which a replica of a user volume is stored. In the event one failure domain is down or inaccessible, the other replica may still be accessible and a user may still access the data. Similarly, in the event of a node failure, only one partition in one failure domain may be inaccessible. In a data center environment, which may include thousands of storage nodes, storage node failure may be common in both online and offline scenarios (e.g., which may be caused by hot spotting, over-subscription, noisy neighbor nodes, or hardware failure). Storage node failure may be disruptive to a user absent a method to dynamically and promptly move and re-map partitions.

The present disclosure relates to a system for and method of remapping of one or more partitions proactively and dynamically in the event of a node failure in live or offline scenarios. A distributed volume for a compute node may be stored on a number of partitions mapped to a number of nodes in two or more failure domains, where each failure domain of the at least two failure domains is associated with a respective set of nodes of the number of nodes, and where each failure domain of the at least two failure domains is associated with a respective copy of the distributed volume. The compute node may be a host system where a user application is using the data stored in the distributed volume. Failure of a first storage node in a first failure domain may be detected, for example by at least one processor of the SDS. A partition of the number of partitions stored on the first storage node may be moved to a different, second storage node in the first failure domain or in a second failure domain, where the partition is moved to the first failure domain or the second failure domain that each differ from a failure domain storing a partition that is complementary to the first partition. A first partition on a first failure domain may be referred to as complementary to a second partition on a second failure domain if the first partition stores the same data as the second partition or if the data stored on the second partition may be used to restore the data stored on the first partition in the event the first partition fails (e.g., the data stored on the second partition may include similar data, that may or might not be identically the same data as stored in the first partition, that may be used to restore some or all of the data stored on the first partition). For example, each failure domain may include a replica of the distributed volume, and when a partition on a first failure domain is moved, the partition may be moved to a failure domain that is different from another failure domain that stores a replica of the partition stored on the first failure domain. A mapping for the distributed volume indicating that the partition is stored on the second storage node may be transmitted to the compute node. The partition move may be transparent to a user. For example, a user may be unaware that a storage node has failed and that a partition stored on a storage node in the SDS has been moved to another storage node. Accordingly, the described partition move may be accomplished promptly and without interrupting user applications or interrupting user data traffic.

In some examples, moving a partition from the first storage node to the second storage node may involve copying the partition data on the first storage node to the second storage node. In some examples, moving the partition may involve syncing the data in a partition on a storage node in the second failure domain that corresponds to the partition on the first node in the first failure domain to the second storage node. The partition in the second failure domain that corresponds to the partition in the first failure domain may be referred to as a complementary partition. In some examples, indicating the mapping may involve indicating a volume identifier, a storage node identifier, and a partition identifier for the second storage node.

In some examples, failure of a given node may be detected based on an indication from a user interface. In some examples, failure of a storage node may be detected based on operations metrics received from an access manager associated with the given storage node. In some examples, the operations metrics may include an amount of traffic associated with the given storage node or a down time associated with the given storage node (e.g., if the access manager has not transmitted a heartbeat indication for a threshold duration).

Aspects of the disclosure are initially described in the context of an environment supporting an on-demand database service. Aspects of the disclosure are further described in the context of storage architectures and a process flow. Aspects of the disclosure are further illustrated by and described with reference to apparatus diagrams, system diagrams, and flowcharts that relate to data placement and recovery in the event of partition failures.

FIG. 1 illustrates an example of a system 100 for cloud computing that supports techniques to achieve cache coherency across distributed storage clusters in accordance with various aspects of the present disclosure. The system 100 includes cloud clients 105, user devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a computing device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be part of a business, an enterprise, a non-profit, a startup, or another organization type.

A cloud client 105 may facilitate communication between the data center 120 and one or multiple user devices 110 to implement an online marketplace. The network connection 130 may include communications, opportunities, purchases, sales, or other interaction between a cloud client 105 and a user device 110. A cloud client 105 may access cloud platform 115 to store, manage, and process the data communicated via one or more network connections 130. In some cases, the cloud client 105 may have an associated security or permission level. A cloud client 105 may have access to certain applications, data, and database information within cloud platform 115 based on the associated security or permission level, and may not have access to others.

The user device 110 may interact with the cloud client 105 over network connection 130. The network may implement transfer control protocol and internet protocol (TCP/IP), such as the Internet, or may implement other network protocols. The network connection 130 may facilitate transport of data via email, web, text messages, mail, or other appropriate form of electronic interaction (e.g., network connections 130-a, 130-b, 130-c, and 130-d) via a computer network. In an example, the user device 110 may be computing device such as a smartphone 110-a, a laptop 110-b, and also may be a server 110-c or a sensor 110-d. In other cases, the user device 110 may be another computing system. In some cases, the user device 110 may be operated by a user or group of users. The user or group of users may be a customer, associated with a business, a manufacturer, or other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support an online application. This may include support for sales between buyers and sellers operating user devices 110, service, marketing of products posted by buyers, community interactions between buyers and sellers, analytics, such as user-interaction metrics, applications (e.g., computer vision and machine learning), and the Internet of Things. Cloud platform 115 may receive data associated with generation of an online marketplace from the cloud client 105 over network connection 135, and may store and analyze the data. In some cases, cloud platform 115 may receive data directly from a user device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or via network connection 130 between a user device 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, partition manager 145, and data center 120 that may coordinate with cloud platform 115 and data center 120 to implement an online marketplace. In some cases, data processing may occur at any of the components of subsystem 125, or at a combination of these components. In some cases, servers may perform the data processing. The servers may be a cloud client 105 or located at data center 120.

The partition manager 145 may communicate with cloud platform 115 via connection 155, and may also communicate with data center 120 via connection 150. The partition manager 145 may receive signals and inputs from user device 110 via cloud clients 105 and via cloud platform 115 or data center 120.

Some ecommerce systems may provide a marketplace where billions of products are listed from millions of sellers. The amount of new data creation may continuously grow and a large amount of new data may be created every day. Such data may include product listing information, media files, various logs generated by services in production, machine learning, and analytical workloads, and/or other secondary sources that monitor these transactions. In some instances, some of the data may be ephemeral while others may be durable for a long time to satisfy regulatory compliances. Such different use-cases may be associated with different service level objectives from the underlying storage in terms of latency and throughput. In some aspects, some storage systems may provide a block storage access.

SDS may provide provides users with remote data volumes spread across multiple storage nodes across multiple failure domains (e.g., within the data center 120). A storage node may be a Kubernetes (K8s) pod running on a Kubernetes node, and a K8s node may have several SDS storage pods running. For example, a platform of an online marketplace may use SDS. A storage node may include a hard disk, memory, or the like, that is used to store digital information. In an example, a user volume may be spread across two replicas (e.g., failure domains), each replica having ten partitions on different storage nodes. Although ten partitions are used herein as an example, any suitable number of partitions are considered. In the event one failure domain is down or inaccessible, the other replica is still accessible and user may still access the data. Similarly, in the event of a storage node failure, only one partition in one failure domain may be inaccessible. In a data center environment, which may include thousands of storage nodes, storage node failure may be common in both online and offline scenarios (e.g., which may be caused by hot spotting, over-subscription, noisy neighbor nodes, or hardware failure). Storage node failure may be disruptive to a user absent a method to dynamically and promptly move and re-map partitions.

System 100 may dynamically and promptly move and re-map partitions in the event of storage node failure. A distributed volume for a compute node (e.g., a user device 110) may be stored on a number of partitions mapped to a number storage nodes in at least two failure domains within the data center 120. Each failure domain of the at least two failure domains is associated with a respective set of storage nodes of the number of storage nodes, and each failure domain of the at least two failure domains is associated with a respective copy of the distributed volume. The compute node may be a user device 110 that uses the data of the distributed volume to run a user application. The user device 110 may access data within the distributed volume stored in the data center 120 via the cloud client 105 and the cloud platform 115. The partition manager 145 may detect failure of a first storage node within the data center 120, where the first storage node stores a first partition of the distributed volume. The partition manager 145 may move the first partition of the distributed volume stored on the first storage node to a different, second storage node in the first failure domain or in a second failure domain, where the first partition is moved to the first failure domain or the second failure domain differ from a failure domain storing a partition that is complementary to the first partition. For example, each failure domain may include a replica of the distributed volume, and when a partition on a first failure domain is moved, the partition may be moved to a failure domain that is different from another failure domain that stores a replica of the partition stored on the first failure domain. The partition manager 145 may transmit a mapping for the distributed volume indicating that the partition is stored on the second storage node may be indicated to the compute node. For example, the mapping may be transmitted to a user device 110 via the cloud platform 115 and the cloud client 105. The partition move may be transparent to a user. For example, a user operating a user device 110 may be unaware that a storage node has failed and that a partition stored on a storage node in the SDS has been moved to another storage node. Accordingly, the described partition move may be accomplished promptly and without interrupting user applications or interrupting user data traffic.

In some examples, the partition manager 145 may move a partition from the first storage node to the second storage node via copying the partition data on the first storage node to the second storage node. In some examples, the partition manager 145 may move a partition from the first storage node to the second storage node via syncing the data in a partition on a storage node in the second failure domain that corresponds to the partition on the first storage node in the first failure domain to the second storage node. The partition in the second failure domain that corresponds to the partition in the first failure domain may be referred to as a complementary partition. In some examples, indicating the mapping may involve indicating a volume identifier, a storage node identifier, and a partition identifier for the second storage node.

In some examples, failure of a given storage node may be detected based on an indication from a user interface, for example via a user device 110. In some examples, failure of a storage node may be detected based on operations metrics received from an access manager associated with the given storage node. For example, access managers associated with given storage nodes may provide reports including operations metrics for the given storage nodes to the partition manager 145. In some examples, the operations metrics may include an amount of traffic associated with the given storage node or a down time associated with the given storage node (e.g., if the access manager has not transmitted a heartbeat indication for a threshold duration).

As one example, where the system 100 supports an online marketplace, the data of the distributed volume may include data associated with products from millions of sellers, as described herein. The distributed volume including the product data may be stored across multiple storage nodes across multiple failure domains within the data center 120. For example, two replicas of the distributed volume may be stored across multiple partitions (e.g., 10 partitions per replica), which may be stored on multiple storage nodes. Node failure may occur in online or offline scenarios, and when node failure occurs, a partition stored on the storage node may be inaccessible to a user. For example, for an online marketplace, product data stored in a partition stored on the failed storage node may be inaccessible. The partition manager 145 of system 100 may promptly and dynamically remap the partition on a failed node to another storage node in a manner that is transparent to a user, where the user may be the manager of the online marketplace. Accordingly, a user (e.g., a manager) of the online marketplace may access and manage product data even in the event of a storage node failure with minimal or no interruption. Further, the storage node failure and partition move may be transparent to a customer of the online marketplace or a seller of the online marketplace, and customer or seller data may be accessed even in the event of a storage node failure.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
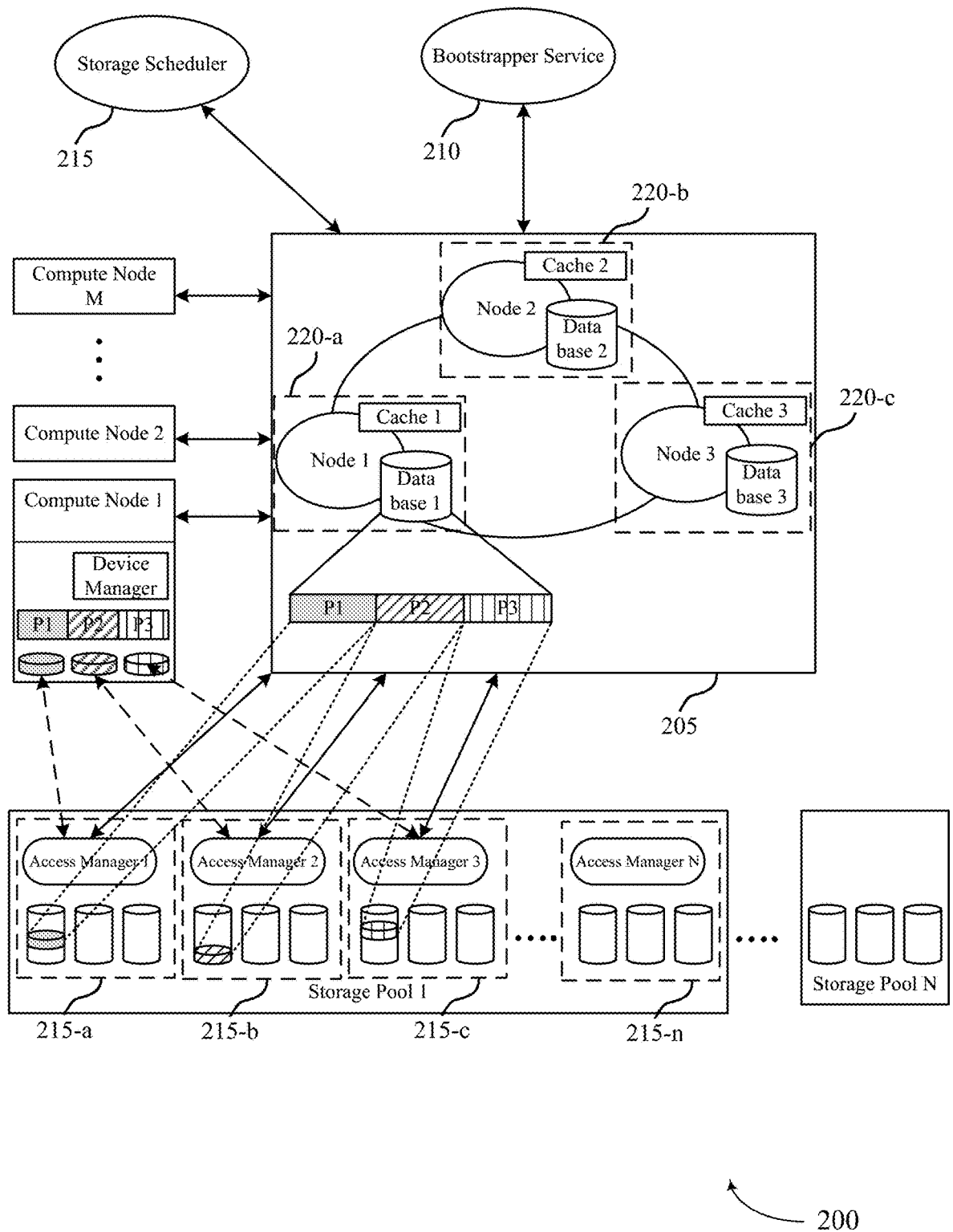
FIG. 2 illustrates an example of a storage architecture that supports data placement and recovery in the event of partition failures in accordance with aspects of the present disclosure.

FIG. 2 illustrates an example of a storage architecture 200 that supports data placement and recovery in the event of partition failures in accordance with aspects of the present disclosure. In the example of FIG. 2, the storage architecture 200 is implemented by partition manager 145 using a neuron cluster 205. The neuron cluster 205 includes a set of servers 220 (e.g., one or more servers). Each server 220 (e.g., including server 220-a, server 220-b, and server 220-c) may include a storage node, a cache, a database, or any combination thereof. Such servers may store replicas of distributed volumes (e.g., each server 220 may be a distinct failure domain for the distributed volume). The neuron cluster 205 may provide for a storage architecture, where one or more replicas may continue to operate with quorum even under the failure of at least one of the replicas. If a replica fails, the storage architecture may provide for automatic spawning of a replacement replica. The replacement replica may then be added (as a follower control plane node) to the neuron cluster 205.

In some aspects, the neuron cluster 205 may use a distributed consensus protocol to elect a leader control plane node, and the other control plane nodes of the cluster are referred to as follower control plane nodes. During the bootstrapping of the neuron cluster 205, a workflow engine (bootstrapper service 210) may create the replicas, and each replica may include an ability to boot up as a leader control plane node. In some examples, the workflow engine may randomly choose one of the replicas and designate it as a leader of the neuron cluster. The workflow engine may add the rest of the replicas to the leader control plane node as follower control plane nodes. In the example of FIG. 2, the neuron cluster 205 may include Node 1, Node 2, and Node 3 (although any number of nodes are contemplated). The workflow engine may elect Node 1 as a leader control plane node and Node 2 and Node 3 as follower control plane nodes. Once the neuron cluster 205 is formed, the storage architecture 200 may implement a protocol for management of the cluster operations. The storage architecture 200 may provide for replication of log entries to achieve faster failover in case of a change in the leader node. Each node may have a local key-value store (database 1, database 2, and database 3) which the state machines are persisted. In some examples, a leader control plane node may initiate a state machine replication, and subsequent read operations and write operations may flow from the leader node to follower nodes.

A neuron architecture (e.g., neuron replicated control plane service), as depicted in FIG. 2, may include five components: a cluster manager, a provisioner, a storage pool manager, an application and programming interface (API) server, and a raft manager. The cluster manager may configure cluster membership management of the storage nodes. The provisioner may manage volume related operations and may perform intelligent data placement. The storage pool manager may categorize the storage nodes based on tenants. The API server may provide an external API interface. The raft manager may implement a consensus protocol for leader election, may provide fault-tolerance by state machine replication of cluster meta-data and may manage a consistent cache across up to all replicas.

As depicted in the example of FIG. 2, the neuron cluster 205 is facilitated by a bootstrapper service 210, also known as a workflow engine. The bootstrapper service 210 may initiate the control plane nodes to form the neuron cluster 205. The bootstrapper service 210 may then initiate one or more storage nodes also known as storage nodes 215 (e.g., storage node 215-a, storage node 215-b, storage node 215-c, storage node 215-n). An access manager may be associated with and manage one or more storage node 215 (e.g., access manager 1 may be associated with and manage storage node 215-a, access manager 2 may be associated with and manage storage node 215-b, access manager 3 may be associated with and manage storage node 215-c, and access manager n may be associated with and manage storage node 215-n). The set of control plane nodes (Node 1, Node 2, and Node 3) may coordinate with a set of data plane nodes 215, referred to herein as storage nodes, for storing data in underlying hard disks control by a respective storage node 215. As depicted in the example of FIG. 2, the bootstrapper service 210 initiates storage nodes 215-a through 215-n (associated with access managers 1 through N) in storage pool 1. The bootstrapper service 210 may also initiate multiple storage pools (storage pools 1 through N). In some examples, the storage nodes 215 associated with each access manager may register with a cluster manager running on a leader control plane node. In the example where the leader control plane node is Node 1, the storage nodes register with Node 1. The cluster manager residing on Node 1 may assign a unique identifier to each of these nodes 215 and may grant them a lease which the storage nodes 215 renew during a time period (e.g., every few seconds). The storage or storage nodes 215 may include three main components: a storage engine (also known as Homestore), a control plane component, and a storage target. The storage engine may be a high-performance engine built using extensible b+tree. The control plane component may have a server running to create a volume automatically that includes replica and partitions which are on several different storage nodes. In some examples, a storage engine may be built with a fully asynchronous threading model. The storage engine may run in user-space and may be configured to bypass the kernel, and use stream based allocations—where the storage engine uses different types of block allocation schemes to balance the speed of allocation, write amplification, and fragmentation.

According to aspects depicted in the present disclosure, the leader control plane node (Node 1) may receive a request to store data in a distributed storage system including the set of storage nodes (access manager 1, access manager 2, and access manager 3). For example, the leader control plane node may receive a request from one or more compute nodes (compute nodes 1 through M) requesting storage of data. The leader control plane node (Node 1) may generate cache data identifying an instruction from the leader control plane node to one or more storage nodes 215 managed by the leader control plane node of the set of storage nodes 215. Node 1 may generate cache data including the instruction and may store the cache data in Cache 1. A cache, as described herein, may refer to a memory or other computer storage device capable of storing instructions, data, information, or the like. In some examples, the instruction may instruct the one or more storage nodes to store the data indicated in the request. For instance, Node 1 may receive a request to store data portions P1, P2, and P3. In some examples, data portions P1, P2, and P3 may be partitions of a distributed volume. For example, in the context of an online marketplace, P1, P2, and P3 may be partitions of the distributed volume of the online marketplace (e.g., which may include product listings and customer and seller data). The instructions may instruct the access manager 1 to store data portion P1, the access manager 2 to store data portion P2, and the access manager 3 to store data portion P3.

As depicted herein, the storage architecture 200 may represent a central repository of a storage service. The storage architecture 200 may maintain a storage cluster metadata and may replicate the metadata across several nodes. The number of replicas may depend on the amount of fault tolerance desired in each deployed environment.

Figure 3:
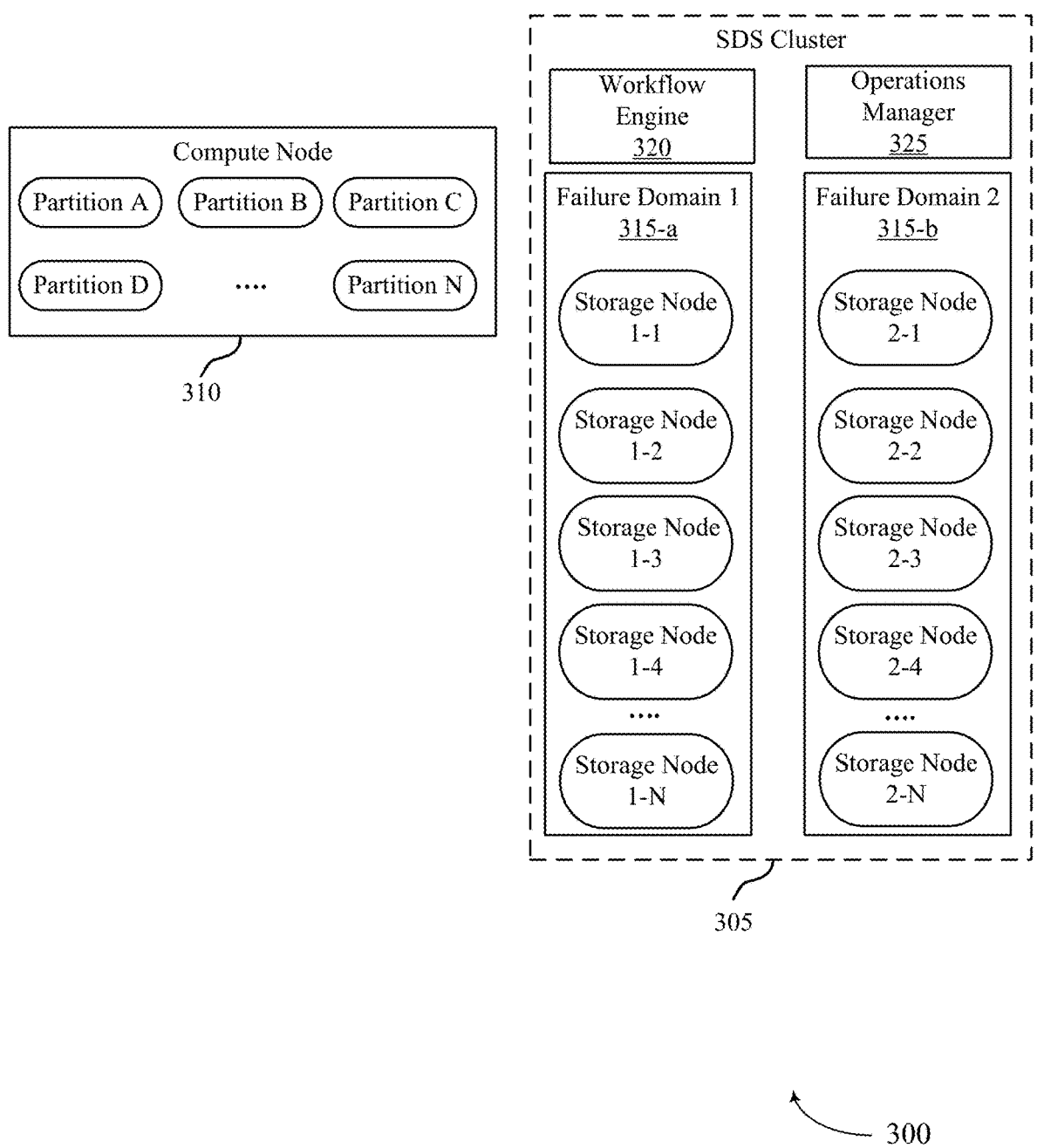
FIG. 3 illustrates an example of a storage architecture that supports data placement and recovery in the event of partition failures in accordance with aspects of the present disclosure.

FIG. 3 illustrates an example of a storage architecture 300 implemented by partition manager 145 that supports data placement and recovery in the event of partition failures in accordance with aspects of the present disclosure.

A compute node 310 may run a user application of a client device that uses data of a distributed volume stored on an SDS cluster 305 (e.g., a neuron cluster 205 of FIG. 2 implemented by partition manager 145). The SDS cluster 305 may include more than one failure domain 315 (e.g., first failure domain 315-a and second failure domain 315-b) that each include a replica distributed volume. Each failure domain may correspond to a server 220 of FIG. 2. Each failure domain may include multiple storage nodes, which may correspond to storage nodes 215 of FIG. 2. The distributed volume may include a number of partitions stored across storage nodes of the first failure domain 315-a and the second failure domain. Although two failure domains are shown in FIG. 3, any number of failure domains are contemplated. In some examples, the SDS cluster 305 may include a workflow engine 320 and an operations manager 325 which may manage the storage nodes of the SDS cluster 305 and manage communications with the compute node 310.

The compute node 310 may establish a connection with the SDS cluster 305 (e.g., via an Internet Small Computer Systems Interface (iSCSI)). The compute node 310 may access partitions of a distributed volume stored on the SDS cluster 305 to access data of the distributed volume. For example, a connection interface may transmit a mapping to the compute node 310 which indicates where the partitions of the distributed volume are stored on the SDS cluster 305 (e.g., by failure domain identifier and storage node identifier). For example, partition A for the compute node 310 may be mapped to storage node 1-1 and partition B may be mapped to storage node 1-2.

In some cases, a storage node may fail (e.g., which may be due to hot spotting, over-subscription, noisy neighbor nodes, or hardware failure). For example, storage node 1-2, which may be mapped to Partition B, may fail. A partition manager of the SDS cluster 305 may detect failure of the storage node 1-2. In response to detecting that storage node 1-2 has failed, the partition manager may move a partition of the distributed volume that is stored on storage node 1-2 to another storage node, for example storage node 1-3. The replacement node (e.g., storage node 1-3) may be a storage node within the same failure domain (e.g., failure domain 315-a) as the faulty storage node (e.g., storage node 1-2) or another failure domain that is different from the failure domain (e.g., failure domain 315-b) that stores a complementary partition to the partition stored on the faulty storage node (e.g., storage node 1-2). Accordingly, in some examples, more than two failure domains may be used by an SDS to store a distributed volume. In some examples, a partition move may be manually initiated, for example via a user interface of the compute node 310 or via a user interface associated with the SDS cluster 305. An interface to manually trigger a partition move may include an identifier for the distributed volume and the particular storage node. In some examples, the user interface may be associated with a particular volume (e.g., based on the compute node 310), and the user may manually identify a particular partition to move. In some cases, the user interface may be associated with a particular storage node (e.g., if the user interface is associated with a particular computer running the storage node), and accordingly a particular volume and partition may be identified based on the storage node.

In some cases, a partition move may be automatically initiated, for example based on rules or algorithms to detect or prevent storage node failure. For example, access managers associated with given nodes may provide reports including operations metrics for the given nodes to a partition manager, workflow engine 320, or operations manager 325 of the SDS cluster 305. In some examples, the operations metrics may include an amount of traffic associated with the given node or a down time associated with the given node (e.g., if the access manager has not transmitted a heartbeat indication for a threshold duration). In some cases, operations metrics may be indicated on a user interface, which a user may evaluate to determine whether to manually trigger a partition move.

In some cases, the partition manager may copy the data from the partition stored on storage node 1-2 to access manager 1-3. In some examples, the partition manager may copy the data from a complementary partition (e.g., stored on storage node 2-2) in the second failure domain 315-b. The partition manager may transmit an updated mapping for the distributed volume to the compute node 310. For example, the updated mapping may indicate that partition B is stored on storage node 1-3. The compute node 310 may subsequently transmit a read or a write request command for data included in the first partition based on the updated mapping.

A partition move may be a cooperative procedure between distributed components of the compute node 310 and the SDS cluster 305. In the case that a migration may not be accomplished at a given time (e.g., because another partition is actively being migrated or because a replacement storage node is not available at the given time), the SDS cluster 305 may still be in an operation state such that the compute node 310 can connect to the SDS cluster 305 and use data stored on the SDS cluster 305. The system may save transitional states and reattempt a partition move at a later time.

As described herein, depending on the state of the failed storage node, a partition move may be either a cold migration or a live migration. If the faulty or failed storage node is down when the partition move occurs, a partition move may be referred to as a cold migration. A cold migration may be a remediation resort used to prevent data loss from double failure (e.g., if the second failure domain fails as well). If the faulty or failed storage node is still up and running when the partition move occurs (e.g., because the partition move is triggered by a user interface or traffic on the storage node exceeding a threshold), a partition move may be referred to as a live migration. A live migration may be used as a precaution to prevent a storage node from becoming overloaded or failing.

In some cases, for a live migration, the compute node 310 may proactively remove a faulty partition prior to calling the operations manager 325 of the SDS cluster 305 to make the partition change, and then subsequent procedures are the same for a cold migration and a live migration. In some cases, for a live migration, the compute node 310 may indicate to the operations manager 325 of the SDS cluster 305 to prepare a replacement partition. In such cases, the compute node 310 may not perform any destructive operation on a multiple device (MD) device associated with the failed or faulty partition until the operation manager of the SDS cluster 305 responds that the partition move procedure is ready, which maintains the reliability of the distributed volume as in case the replacement partition cannot be prepared, the MD device may not be affected by disk removal and addition. Further, a raft membership change may be divided into two phases: 1) add a member, reassemble, and resync, and 2) remove a member.

For live migrations, a failed or faulty storage node may still be running and may be commanded to leave the group associated with the distributed volume. For a cold migration, as the failed storage node is not operational, the failed storage node may be automatically disassociated from the distributed volume.

In some cases, a partition move may be triggered even when no client (e.g., no compute node 310) is currently using the distributed volume, which may be referred to as an idle mode. For example, when a storage node fails due to hardware issues and the data stored on the failed storage node will be lost, a partition move may be triggered to move the data stored on the partition on the failed storage node whether or not the distributed volume is currently being used by a client. During an idle mode, there is not a client or compute note to execute an SDS cluster reassembly procedure (e.g., a redundant array of independent disk (RAID) procedure). Accordingly, in an idle mode partition move, a dedicated remediation pod may be used to mimic a compute node 310 behavior. For example, a remediation pod or a resync pod that has connection privileges with the SDS cluster 305 (e.g., iSCSI privileges) may be used to resync the distributed volume after a partition move. Further, in an idle mode partition move, a cold migration procedure may be used as the failed or faulty storage node may not be actively providing data to a client or compute node 310.

For example, for an in-use distributed volume, once the partition move is completed, the distributed volume may be in a partially exposed state. In some examples, the access manager associated with the replacement storage node may expose the replacement partition and return the connection information to an operations manager 325 or a workflow engine 320 of the SDS cluster 305, which may indicate the corresponding mapping information to a compute node 310. In some examples, the access manager associated with the replacement storage node may wait for a request from the compute node 310 to expose the distributed volume. In response to a request from the compute node 310 to expose the distributed volume, the access manager associated with the replacement storage node may expose the replacement partition and return the connection information to an operations manager 325 or a workflow engine 320 of the SDS cluster 305, which may indicate the corresponding mapping information to a compute node 310. An implicit expose automatically performed by an access manager may conserve time by eliminating a round of API calls associated with the compute node 310 requesting the distributed volume.

In some examples, when the distributed volume is in-use during a partition move, a multiple device (MD) device running on the compute node 310 may not be torn down. Instead, a faulty device (e.g., a partition associated with the failed or faulty storage node) may be removed and a blank device may be inserted as a replacement. Data resyncing may be managed by the MD running on the compute node 310 (e.g., based on an updated mapping received from the SDS cluster 305). If the distributed volume is in an idle mode, the resync pod may reassemble the distributed volume into a degraded array and add a blank device prior to making the distributed volume active.

When a partition move occurs, the replacement storage node (e.g., storage node 1-3) may either be located in the same failure domain (e.g., first failure domain 315-a if the failed node is storage node 1-2) or another failure domain that is different from another failure domain (e.g., second failure domain 315-b) that stores a complementary partition (e.g., on storage node 2-2) to the partition on the failed node.

In some examples, the SDS cluster 305 may store data for an online marketplace, and the data of the distributed volume may include data associated with products from millions of sellers. Product listing data may be stored in the storage nodes across the failure domain 315-a and the failure domain 315-b. The compute node 310 may be a computing device (e.g., a server or web application) of an operator or manager of the online marketplace. The compute node 310 may access data from partitions stored on the storage nodes of the SDS cluster 305 and serve the data to customers of the online marketplace. As described herein, a partition move may be transparent to a user of the compute node. For example, an operator or manager of the online marketplace may be unaware when a partition on a faulty or failed storage node is moved to a replacement storage node. Further, customers (e.g., buyers or sellers on the online marketplace) may similarly be unaware of partition moves and may not experience disruption caused by the failure of a storage node.

Figure 4:
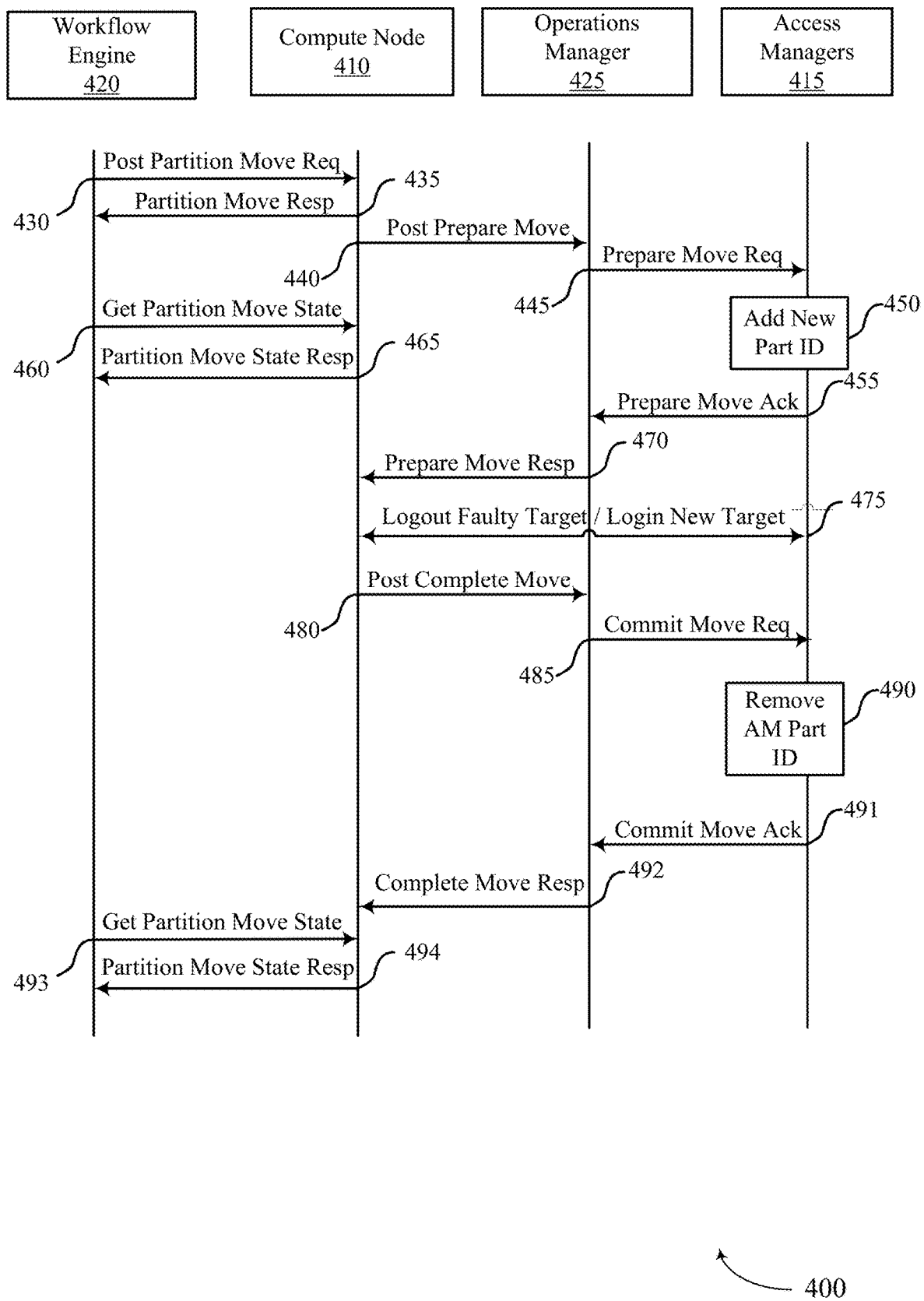
FIG. 4 illustrates an example of a process flow that supports data placement and recovery in the event of partition failures in accordance with aspects of the present disclosure.

FIG. 4 illustrates an example of a process flow 400 that supports data placement and recovery in the event of partition failures in accordance with aspects of the present disclosure. The process flow 400 may implement or be implemented by a system 100 of FIG. 1 that includes partition manager 145, a storage architecture 200 of FIG. 2, or a storage architecture 300 of FIG. 3. Process flow 400 may include a compute node 410, which may be an example of a compute node 310 as described herein. Process flow 400 may include access managers 415, which may be an example access managers associated with storage nodes 215 as described herein. Process flow 400 may include a workflow engine 420, which may create and manage replicas for an SDS. Process flow 400 may include an operations manager 425, which may be an example of an operations manager 325 as described herein. Process flow 400 illustrates an example process for a live migration for a partition for an in-use volume.

The compute node 410 may be in a representational state transfer (REST) state with regard to an SDS associated with the workflow engine 420, the operations manager 425, and the access manager 415. At 430, the workflow engine 420 may post a partition move request to the compute node 410. The partition move request may include a request identifier, a volume identifier of the distributed volume, and a partition identifier. For example, the workflow engine 420 may determine that a storage node storing a partition of the distributed volume that is being used by the compute node 410 has failed or is faulty, as described herein.

At 435, the compute node 410 may transmit a response to the workflow engine 420 that the compute node 410 has initiated the requested partition move.

At 440, the compute node 410 may post a prepare move message to the operations manager 425. The prepare move message may include the volume identifier of the distributed volume and the partition identifier.

At 445, the operations manager 425 may transmit a prepare move request to the access managers associated with the storage nodes that store the distributed volume. The prepare move request may include the volume identifier of the distributed volume and the partition identifier, and a new partition identifier.

At 450, the access managers 415 may add a new access manager associated with the new partition identifier to the group of access managers associated with the failure domain associated with the partition being moved.

At 455, the access managers 415 may transmit a prepare move acknowledgment message to the operations manager 425 in response to the prepare move request received at 445. The prepare move acknowledgment message may include the connection information for the new partition identifier.

At 460, the workflow engine 420 may transmit a partition move state request message to the compute node 410. The partition move state request may include an indication of the request identifier. At 465, in response to the partition move state request message, the compute node 410 may transmit a partition move state response message indicating that the compute node 410 is waiting on a replacement partition.

At 470, the operations manager 425 may transmit, to the compute node 410, a response to the posted prepare move message the operations manager 425 received at 440. The response to the posted prepare move message transmitted at 470 may include the connection information for the new partition identifier.

At 475, the compute node 410 may transmit a message to the access managers 415 to log out of the faulty target storage node and login to the new target storage node. In some cases, the message transmitted at 475 may initiate the access managers 415 to perform a reassemble RAID procedure to reassemble to the distributed volume with the replacement storage node.

At 480, the compute node 410 may post a complete move message to the operations manager 425. The complete move message may include a volume identifier for the distributed volume, the moved partition identifier, and the new partition identifier.

At 485, the operations manager 425 may transmit, to the access managers 415, a commit move request message. The commit move request message may include a volume identifier for the distributed volume, the moved partition identifier, and the new partition identifier.

At 490, the access managers 415 may remove the access manager associated with the moved partition identifier from the group of access managers associated with the failure domain associated with the partition being moved.

At 491, the access managers 415 may transmit a commit move acknowledgment message to the operations manager 425. At 492, the operations manager 425 may transmit, to the compute node 410, a complete move response message in response to the posted complete move message the operations manager 425 received at 480.

At 493, the workflow engine 420 may transmit a partition move state request message to the compute node 410. The partition move state request may include an indication of the request identifier. At 494, in response to the partition move state request message, as the partition move is complete, the compute node 410 may transmit a partition move state response message indicating that the compute node 410 is complete.

As described herein, a partition move may involve a complete data resync for a distributed volume. Accordingly, the partition move process may be completed over a duration of time. The workflow engine 420 may periodically query the status of the partition move (e.g., as shown at 460 and at 493). In some examples, the workflow engine 420 may terminate the partition move if a threshold duration passes without confirmation that the partition move is complete. In some examples, the workflow engine 420 may reinitiate a partition move at a later time after a partition move has timed out (e.g., after a threshold duration has passed). In some examples, the access managers 415 may be in an exposed state during an in-use live migration. In some examples, if the distributed volume is in an idle state, the new partition may not be exposed. In some examples, if the removed storage node is in an exposed state, the compute node 410 may indicate to close the removed storage node (e.g., the iSCSI target associated with the removed storage node should be closed). In some examples, if the storage node associated with the removed partition is completely failed (e.g., dead due to hardware failure), the removal process at 490 may close the iSCSI target associated with the removed storage node.

In some cases, if there is an ongoing partition move task, the workflow engine 420 may prevent another partition move from being initiated. For example, in the case of manually initiated partition moves, the user interface may not allow a second partition move to be initiated while a partition move process is in progress. In some examples, if a partition move process is initiated while another partition move process is already in progress, the second partition move process will immediately fail. In some examples, when the compute node 410 receives the partition move request at 430, the compute node 410 may check whether another partition move process is in progress. In some examples, if the compute node 410 determines that another partition move request is already in progress, then at 435, the compute node 410 may indicate a failed partition move in the partition move response message.

In some examples, when the operations manager 425 receives the partition move request at 440, the operations manager 425 may check whether another partition move process is in progress (for example, based on a state indicator of the operations manager 425). For example, the operations manager 425 may set a bitmap indicating a state based on the stage of the partition move process. If the bitmap indicates that a partition move is in progress, the operations manager 425 may determine that another partition move request is already in progress, and the operations manager 425 may indicate at 470 to the compute node 410 that the requested partition move has failed.

In some examples, to prevent failure of multiple access manager storage nodes, the workflow engine 420 may initiate the partition move process automatically upon detection of a storage node failure or anticipated failure of a storage node failure. In some examples, if multiple storage nodes have failed, the workflow engine 420 may perform partition moves for the failed storage nodes consecutively. The storage nodes may be ordered in an array in the database storing the failure domain, and the workflow engine 420 may initiate partition moves for the failed storage nodes based on the order of the storage nodes in the ordered array.

In some cases, in the event of multiple storage nodes, the workflow engine 420 may initiate multiple partition moves which may be performed consecutively, for example in a group partition move request that identifies multiple partition identifiers. In some examples, if any of the partition moves fail (e.g., at operation 450 or at operation 490), the operations manager 425 and access managers 415 may roll back all of the partition moves requested by the group partition move request and a partition move failure may be indicated to the workflow engine 420.

In some examples, if the partition move fails at the adding a new partition stage at 450, the operations manager 425 may receive an indication at 455 that the partition move failed. The operations manager 425 may indicate to the compute node 410 in the prepare move response at 470 that the partition move failed. In a subsequent partition move state request message from the workflow engine 420, the compute node 410 may indicate that the partition move failed.

In some examples, if the login of the new target storage node at 475 fails, the compute node 410 may roll back the logout. At 480, rather than a post complete move message, the compute node 410 may transmit a rollback move request to the operations manager 425. In such cases, the operations manager 425 may command the access managers 415 associated with the raft group to roll back the addition of the new partition. The access managers 415 may remove the added partition, and the partition move may fail. If either the rollback fails, or the remove access manager part identifier operation at 490 fails, then an additional extraneous storage node may be included in the failure domain. In some examples, the compute node 410 may retransmit a request to remove the extraneous storage node. In some examples, if the remove access manager part identifier operation at 490 fails, then the compute node 410 may transmit a request to retry the remove access manager part identifier operation.

In some examples, operations 450 and 490 may be combined. For example, when the partition is added at operation 450 by the access managers 415, the access managers 415 may also remove the access manager associated with the moved partition identifier from the group of access managers 415 associated with the failure domain associated with the partition being moved. In some examples, to prevent data from being lost or changed during a partition move, the operations manager 425 may prevent another client device from attaching to the distributed volume and the compute node 410 may postpone a detach operation until after the partition move is complete.

Figure 5:
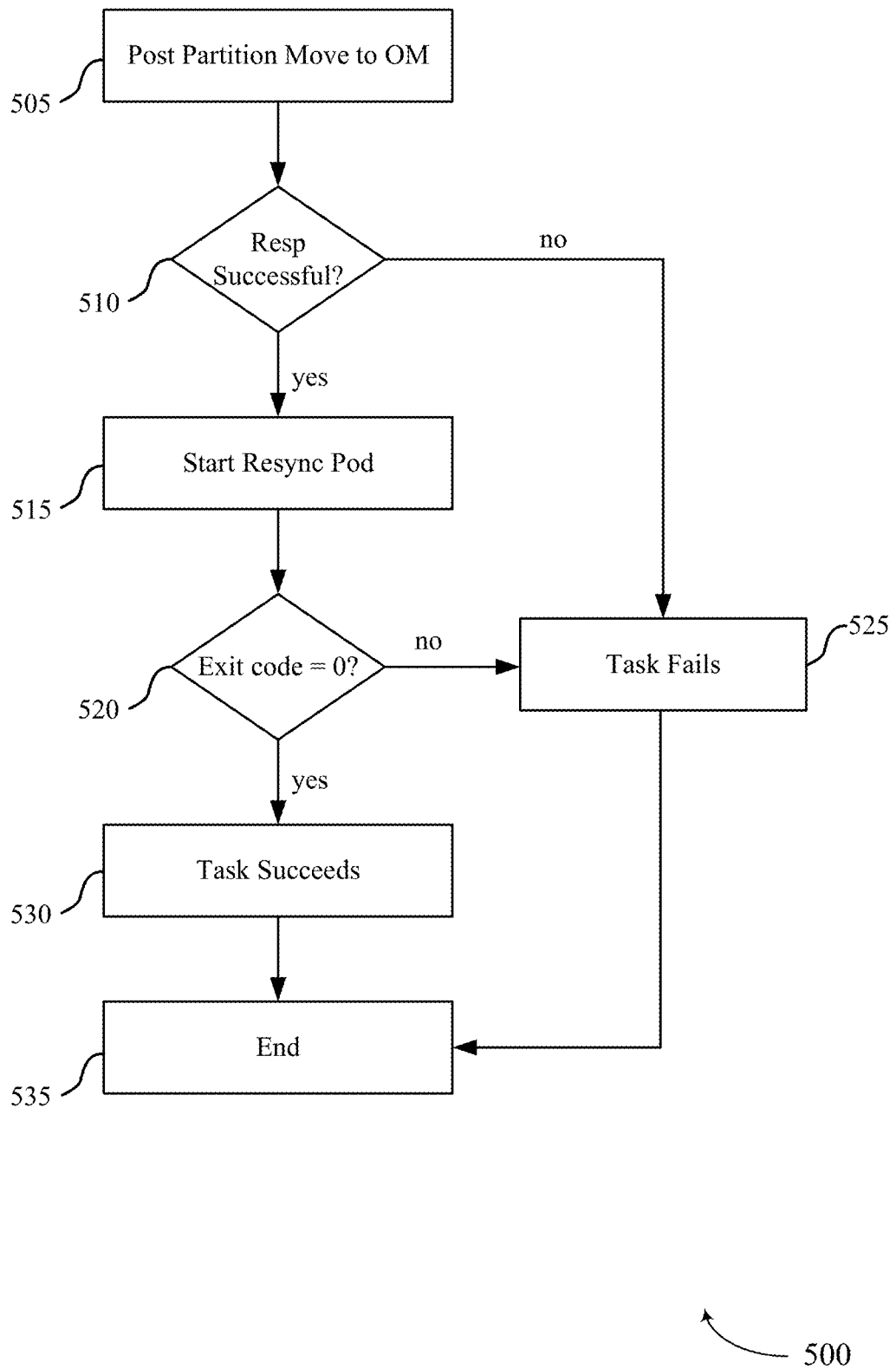
FIG. 5 illustrates an example of a flowchart that supports data placement and recovery in the event of partition failures in accordance with aspects of the present disclosure.

FIG. 5 illustrates an example of a flowchart illustrating a method 500 that supports data placement and recovery in the event of partition failures in accordance with aspects of the present disclosure. The method 500 may implement or be implemented by a system 100 of FIG. 1, a storage architecture 200 of FIG. 2, or a storage architecture 300 of FIG. 3. For example, the method 500 may be performed by an operations manager 325, a workflow engine 320, and access managers as described herein. The method 500 illustrates an example process for an idle mode migration.

For an idle mode migration, there is no active compute node using the distributed volume. Accordingly, an SDS may initiate a resync pod. At 505, a workflow engine may post a partition move to an operations manager. At 510, the workflow engine may determine whether the workflow engine receive a response that the partition move request was successfully received and initiated by the operations manager. For example, if another partition move is in progress when the post partition move is transmitted at 505, the operations manager may terminate the second partition move. If the operations manager indicates a success at 510, then the workflow engine proceeds to 515. If the operations manager indicates a failure at 510, then the workflow engine determines at 525 that the partition move task failed and the process ends. At 515, the workflow engine may initiate a resync pod, which may replace the partition stored on a faulty or failed storage node with a new partition stored on a new storage node.

The resync pod may resync and remap the distributed volume without the faulty storage node and with the new replacement storage node. The resync pod may transmit an exit code when the partition move is complete. At 520, the workflow engine may determine whether the exit code indicates that the partition move was successful (e.g., the exit code may be a bit with a 0 indicating a success and a 1 indicating a failure). At 520, if the exit code indicates a success, the workflow engine determines at 530 that the partition move was a success. Subsequently, the workflow engine may indicate a mapping for the resynced distributed volume to a compute node connecting to the distributed volume. The compute node may subsequently transmit a read or a write request command for data included in the first partition based on the mapping. At 535, the partition move process ends. At 520, if the exit code indicates the partition move was not successful, the workflow engine determines at 525 that the partition move was not successful. At 535, the partition move process ends. In some examples, the workflow engine may subsequently initiate another partition move request. In some examples, the workflow engine may subsequently indicate a mapping for the distributed volume including the faulty or failed storage node for the distributed volume to a compute node connecting to the distributed volume.

When a partition move on an idle mode is ongoing (e.g., during block 515), a user may attempt to access the distributed volume. The workflow engine may prevent a user from accessing the distributed volume during an idle mode partition move process. For example, a user device may receive an indication that the distributed volume is temporarily unavailable.

Figure 6:
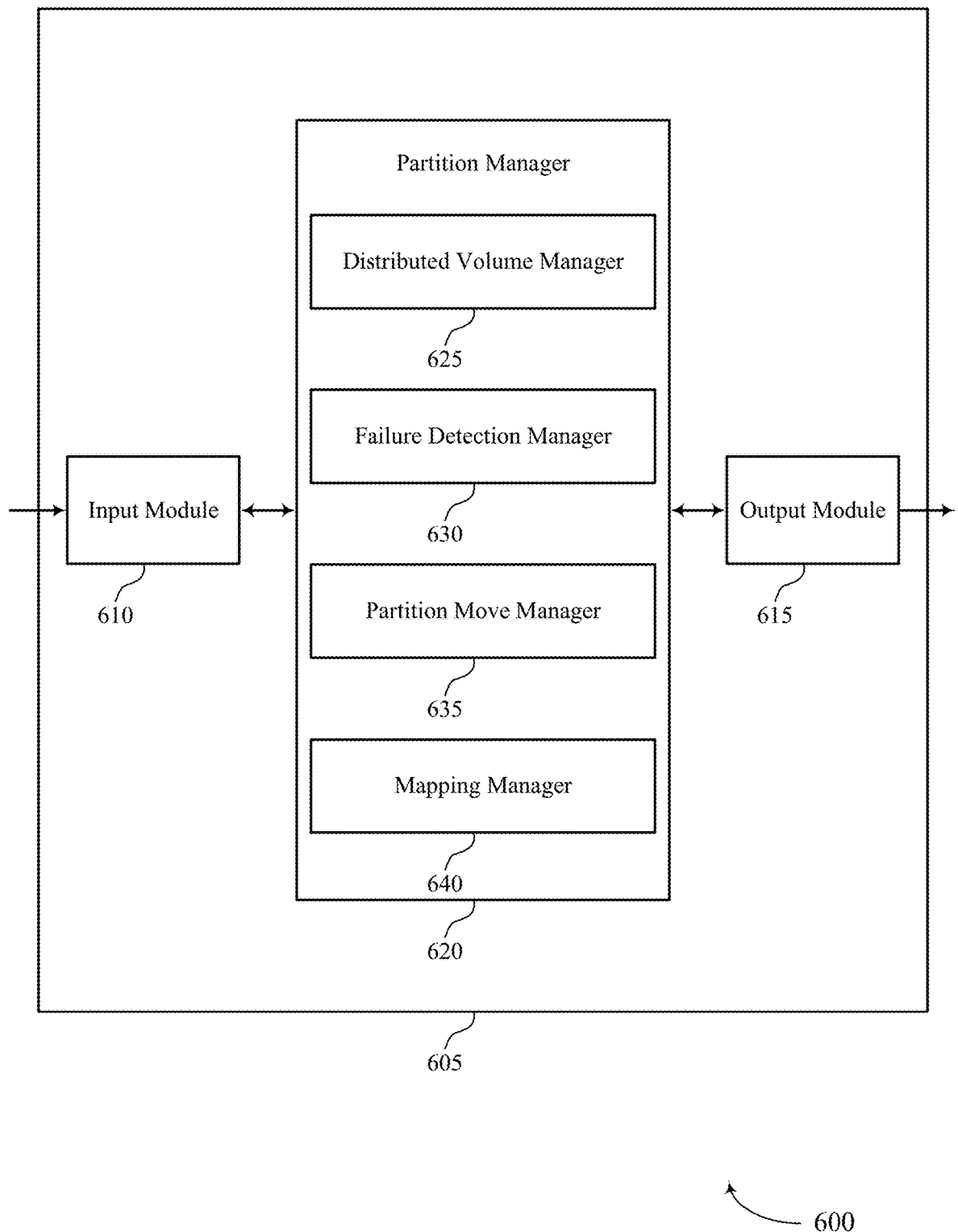
FIG. 6 shows a block diagram of an apparatus that supports data placement and recovery in the event of partition failures in accordance with aspects of the present disclosure.

FIG. 6 shows a block diagram 600 of a device 605 that supports data placement and recovery in the event of partition failures in accordance with aspects of the present disclosure. The device 605 may include an input module 610, an output module 615, and a Partition Manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the Partition Manager 620 to support data placement and recovery in the event of partition failures. In some cases, the input module 610 may be a component of an I/O controller 810 as described with reference to FIG. 8.

The output module 615 may manage output signals for the device 605. For example, the output module 615 may receive signals from other components of the device 605, such as the Partition Manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the Partition Manager 620 may include a distributed volume manager 625, a failure detection manager 630, a partition move manager 635, a mapping manager 640, or any combination thereof. In some examples, the Partition Manager 620, or various components thereof, may be configured to perform various operations (e.g., receiving, monitoring, transmitting) using or otherwise in cooperation with the input module 610, the output module 615, or both. For example, the Partition Manager 620 may receive information from the input module 610, send information to the output module 615, or be integrated in combination with the input module 610, the output module 615, or both to receive information, transmit information, or perform various other operations as described herein.

The distributed volume manager 625 may be configured as or otherwise support a means for storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume. The failure detection manager 630 may be configured as or otherwise support a means for detecting, by at least one processor, failure of a first node of the set of multiple nodes in a first domain of the at least two domains. The partition move manager 635 may be configured as or otherwise support a means for moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition. The mapping manager 640 may be configured as or otherwise support a means for transmitting, to the compute node, a mapping for the distributed volume indicating that the first partition is stored on the second node.

Figure 7:
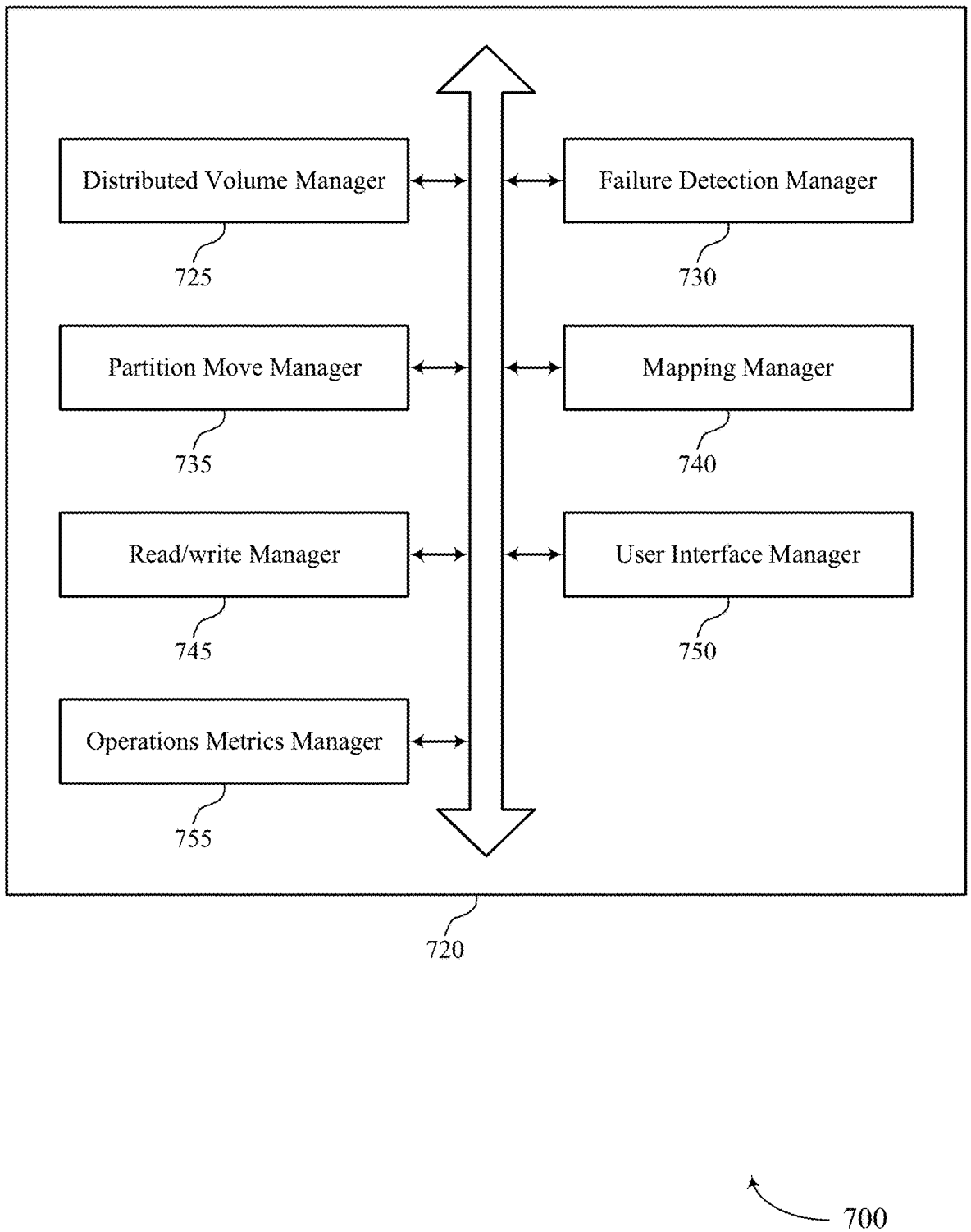
FIG. 7 shows a block diagram of a partition manager that supports data placement and recovery in the event of partition failures in accordance with aspects of the present disclosure.

FIG. 7 shows a block diagram 700 of a Partition Manager 720 that supports data placement and recovery in the event of partition failures in accordance with aspects of the present disclosure. The Partition Manager 720 may be an example of aspects of a Partition Manager or a Partition Manager 620, or both, as described herein. The Partition Manager 720, or various components thereof, may be an example of means for performing various aspects of data placement and recovery in the event of partition failures as described herein. For example, the Partition Manager 720 may include a distributed volume manager 725, a failure detection manager 730, a partition move manager 735, a mapping manager 740, a read/write manager 745, a user interface manager 750, an operations metrics manager 755, or any combination thereof. Each of these components may communicate, directly or indirectly, with one another (e.g., via one or more buses).

The distributed volume manager 725 may be configured as or otherwise support a means for storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume. The failure detection manager 730 may be configured as or otherwise support a means for detecting, by at least one processor, failure of a first node of the set of multiple nodes in a first domain of the at least two domains. The partition move manager 735 may be configured as or otherwise support a means for moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition. The mapping manager 740 may be configured as or otherwise support a means for transmitting, to the compute node, a mapping for the distributed volume indicating that the first partition is stored on the second node.

In some examples, the read/write manager 745 may be configured as or otherwise support a means for receiving, from the compute node, a read or write command for data included in the first partition based on the mapping.

In some examples, to support moving the first partition to the second node, the partition move manager 735 may be configured as or otherwise support a means for copying data from the first partition stored on the first node to the second node.

In some examples, to support moving the first partition to the second node, the partition move manager 735 may be configured as or otherwise support a means for copying data from a second partition stored on a third node in the second domain to the second node, where the second partition corresponds to the first partition.

In some examples, to support detecting failure of the first node, the user interface manager 750 may be configured as or otherwise support a means for receiving an indication of failure of the first node from a user interface.

In some examples, the operations metrics manager 755 may be configured as or otherwise support a means for receiving operations metrics from an access manager associated with the first node, and where detecting failure of the first node is based on the operations metrics.

In some examples, the operations metrics include an amount of traffic associated with the first node. In some examples, detecting failure of the first node is based on the amount of traffic associated with the first node exceeding a threshold.

In some examples, the operations metrics include a down time associated with the first node. In some examples, detecting failure of the first node is based on the down time associated with the first node exceeding a threshold.

In some examples, to support transmitting the mapping, the mapping manager 740 may be configured as or otherwise support a means for indicating a volume identifier, a first partition identifier associated with the first partition stored on the first node, and a second partition identifier associated with the second node.

Figure 8:
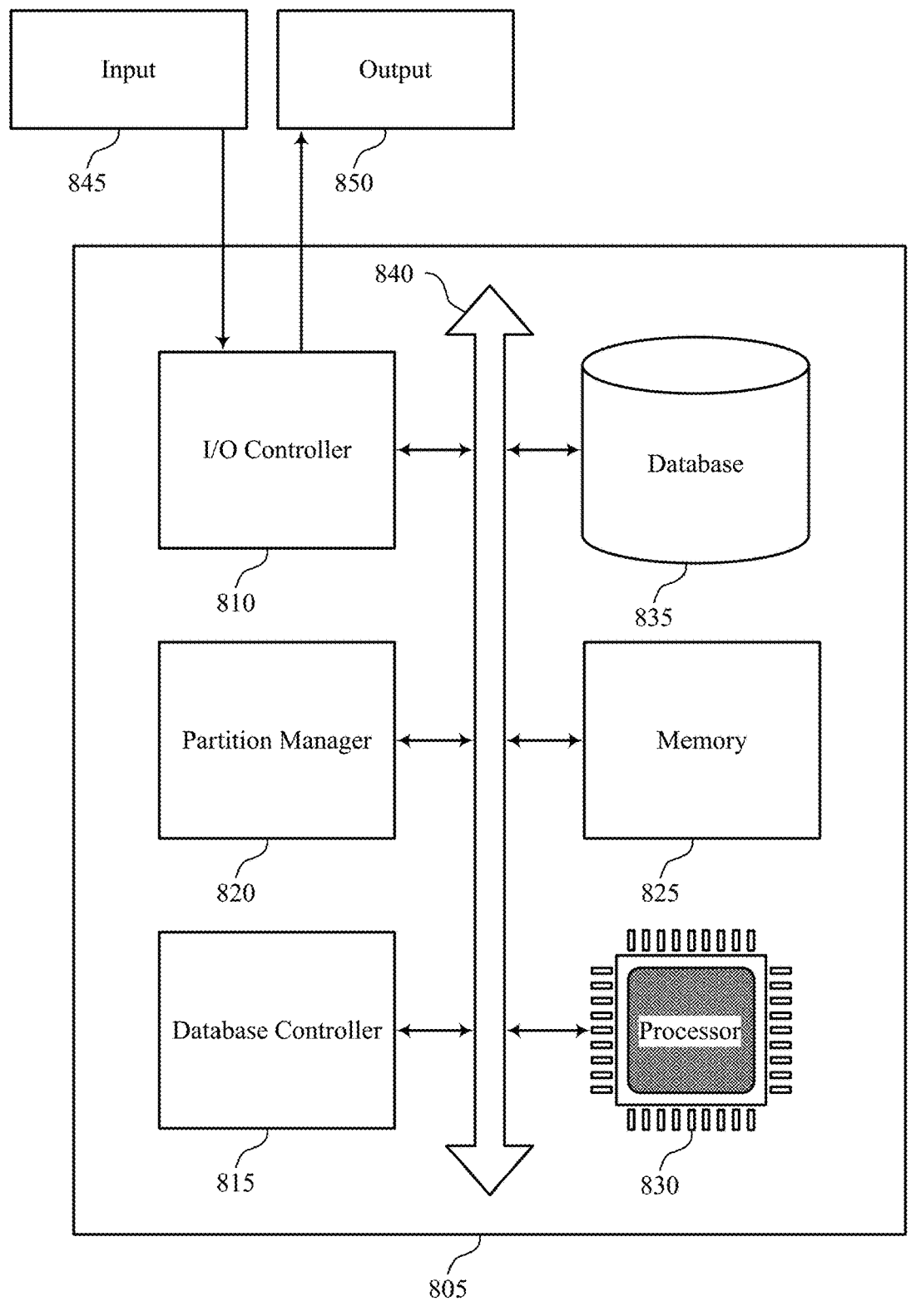
FIG. 8 shows a diagram of a system including a device that supports data placement and recovery in the event of partition failures in accordance with aspects of the present disclosure.

FIG. 8 shows a diagram of a system 800 including a device 805 that supports data placement and recovery in the event of partition failures in accordance with aspects of the present disclosure. The device 805 may be an example of or include the components of a device 605 as described herein. The device 805 may include components for bi-directional data communications including components for transmitting and receiving communications, such as a Partition Manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a Basic Input/Output System (BIOS) which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting data placement and recovery in the event of partition failures).

For example, the Partition Manager 820 may be configured as or otherwise support a means for storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume. The Partition Manager 820 may be configured as or otherwise support a means for detecting, by at least one processor, failure of a first node of the set of multiple nodes in a first domain of the at least two domains. The Partition Manager 820 may be configured as or otherwise support a means for moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition. The Partition Manager 820 may be configured as or otherwise support a means for transmitting, to the compute node, a mapping for the distributed volume indicating that the first partition is stored on the second node.

By including or configuring the Partition Manager 820 in accordance with examples as described herein, the device 805 may support techniques may support techniques for improved data storage functionality, reduced latency, improved user experience related to efficient data processing, and more efficient utilization of storage resources.

Figure 9:
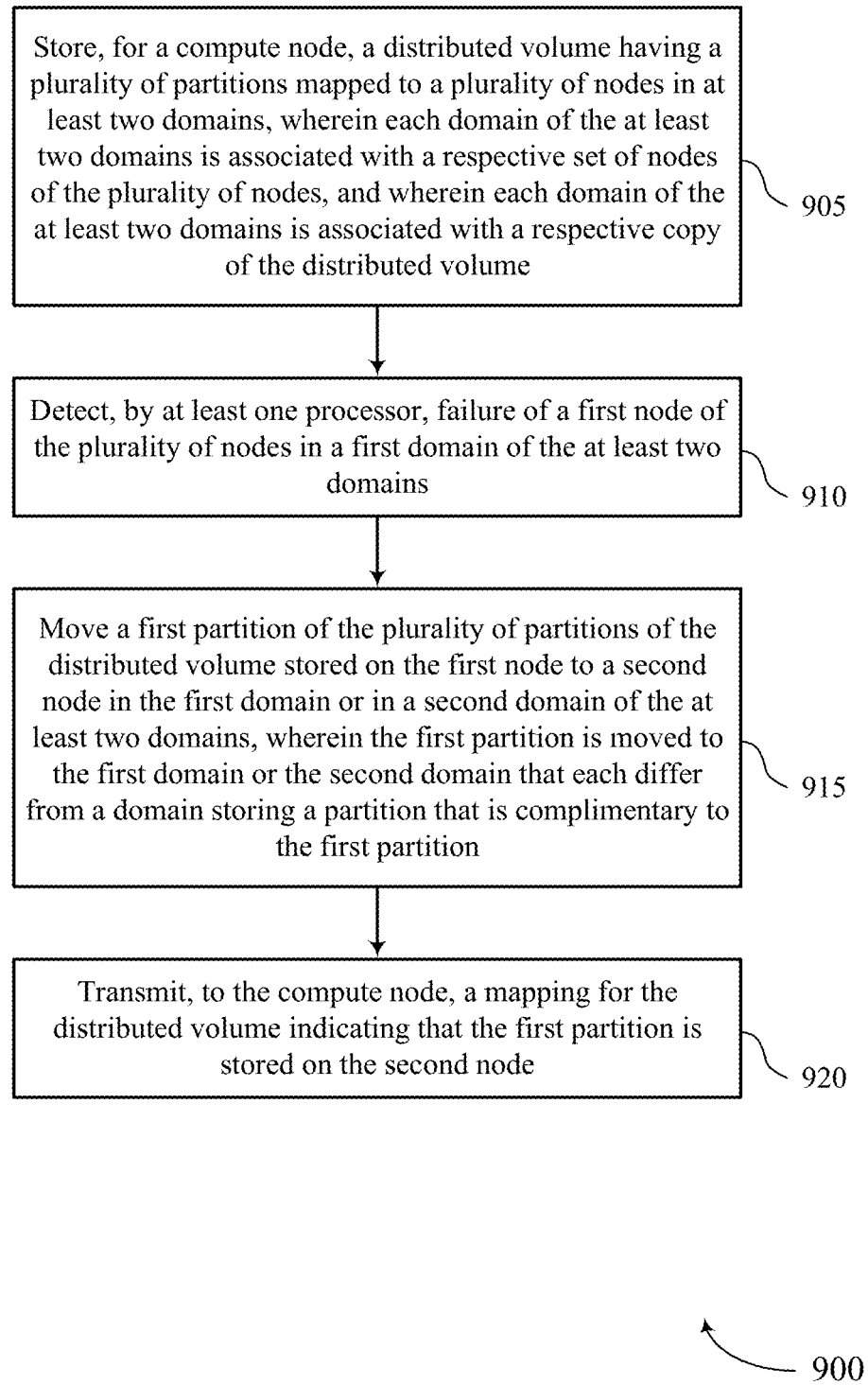
FIGS. 9 through 13 show flowcharts illustrating methods that support data placement and recovery in the event of partition failures in accordance with aspects of the present disclosure.

FIG. 9 shows a flowchart illustrating a method 900 that supports data placement and recovery in the event of partition failures in accordance with aspects of the present disclosure. The operations of the method 900 may be implemented by a Partition Manager or its components as described herein. For example, the operations of the method 900 may be performed by a Partition Manager as described with reference to FIG. 1 through 8. In some examples, a Partition Manager may execute a set of instructions to control the functional elements of the Partition Manager to perform the described functions. Additionally, or alternatively, the Partition Manager may perform aspects of the described functions using special-purpose hardware.

At 905, the method may include storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume. The operations of 905 may be performed in accordance with examples as disclosed herein. In some examples, aspects of the operations of 905 may be performed by a distributed volume manager 725 as described with reference to FIG. 7.

At 910, the method may include detecting, by at least one processor, failure of a first node of the set of multiple nodes in a first domain of the at least two domains. The operations of 910 may be performed in accordance with examples as disclosed herein. In some examples, aspects of the operations of 910 may be performed by a failure detection manager 730 as described with reference to FIG. 7.

At 915, the method may include moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition. The operations of 915 may be performed in accordance with examples as disclosed herein. In some examples, aspects of the operations of 915 may be performed by a partition move manager 735 as described with reference to FIG. 7.

At 920, the method may include transmitting, to the compute node, a mapping for the distributed volume indicating that the first partition is stored on the second node. The operations of 920 may be performed in accordance with examples as disclosed herein. In some examples, aspects of the operations of 920 may be performed by a mapping manager 740 as described with reference to FIG. 7.

Figure 10:
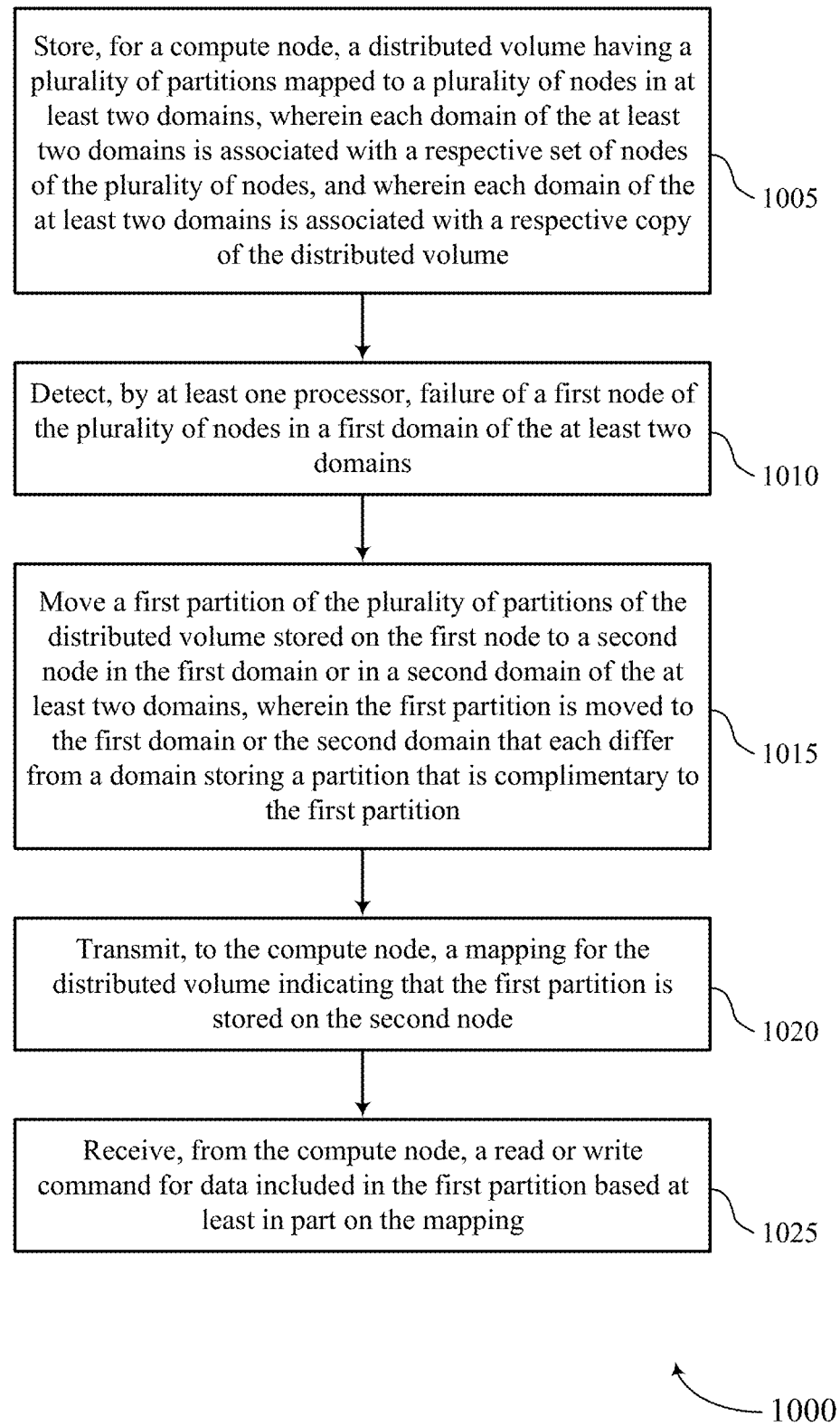

FIG. 10 shows a flowchart illustrating a method 1000 that supports data placement and recovery in the event of partition failures in accordance with aspects of the present disclosure. The operations of the method 1000 may be implemented by a Partition Manager or its components as described herein. For example, the operations of the method 1000 may be performed by a Partition Manager as described with reference to FIG. 1 through 8. In some examples, a Partition Manager may execute a set of instructions to control the functional elements of the Partition Manager to perform the described functions. Additionally, or alternatively, the Partition Manager may perform aspects of the described functions using special-purpose hardware.

At 1005, the method may include storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume. The operations of 1005 may be performed in accordance with examples as disclosed herein. In some examples, aspects of the operations of 1005 may be performed by a distributed volume manager 725 as described with reference to FIG. 7.

At 1010, the method may include detecting, by at least one processor, failure of a first node of the set of multiple nodes in a first domain of the at least two domains. The operations of 1010 may be performed in accordance with examples as disclosed herein. In some examples, aspects of the operations of 1010 may be performed by a failure detection manager 730 as described with reference to FIG. 7.

At 1015, the method may include moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition. The operations of 1015 may be performed in accordance with examples as disclosed herein. In some examples, aspects of the operations of 1015 may be performed by a partition move manager 735 as described with reference to FIG. 7.

At 1020, the method may include transmitting, to the compute node, a mapping for the distributed volume indicating that the first partition is stored on the second node. The operations of 1020 may be performed in accordance with examples as disclosed herein. In some examples, aspects of the operations of 1020 may be performed by a mapping manager 740 as described with reference to FIG. 7.

At 1025, the method may include receiving, from the compute node, a read or write command for data included in the first partition based on the mapping. The operations of 1025 may be performed in accordance with examples as disclosed herein. In some examples, aspects of the operations of 1025 may be performed by a read/write manager 745 as described with reference to FIG. 7.

Figure 11:
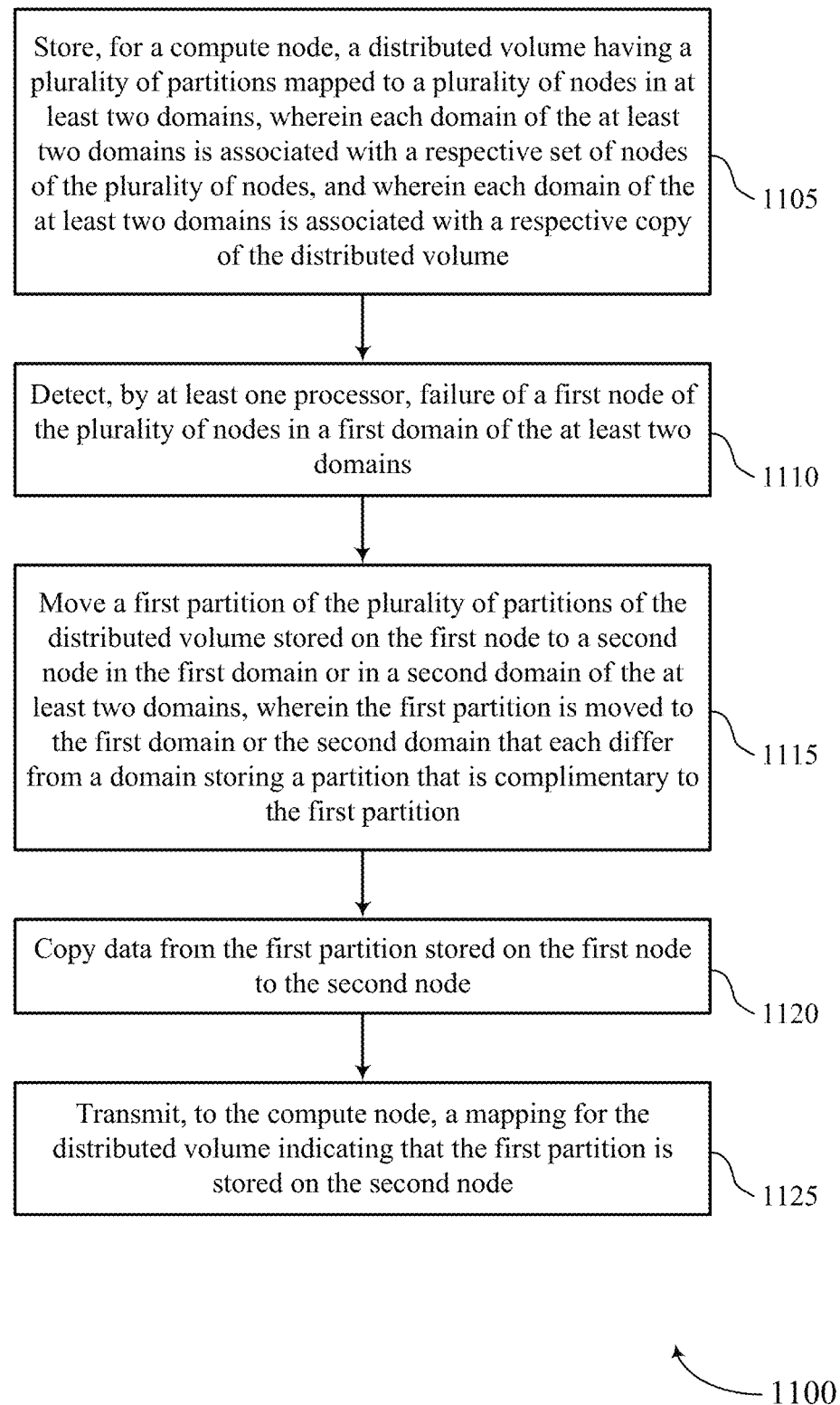

FIG. 11 shows a flowchart illustrating a method 1100 that supports data placement and recovery in the event of partition failures in accordance with aspects of the present disclosure. The operations of the method 1100 may be implemented by a Partition Manager or its components as described herein. For example, the operations of the method 1100 may be performed by a Partition Manager as described with reference to FIG. 1 through 8. In some examples, a Partition Manager may execute a set of instructions to control the functional elements of the Partition Manager to perform the described functions. Additionally, or alternatively, the Partition Manager may perform aspects of the described functions using special-purpose hardware.

At 1105, the method may include storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume. The operations of 1105 may be performed in accordance with examples as disclosed herein. In some examples, aspects of the operations of 1105 may be performed by a distributed volume manager 725 as described with reference to FIG. 7.

At 1110, the method may include detecting, by at least one processor, failure of a first node of the set of multiple nodes in a first domain of the at least two domains. The operations of 1110 may be performed in accordance with examples as disclosed herein. In some examples, aspects of the operations of 1110 may be performed by a failure detection manager 730 as described with reference to FIG. 7.

At 1115, the method may include moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition. The operations of 1115 may be performed in accordance with examples as disclosed herein. In some examples, aspects of the operations of 1115 may be performed by a partition move manager 735 as described with reference to FIG. 7.

At 1120, the method may include copying data from the first partition stored on the first node to the second node. The operations of 1120 may be performed in accordance with examples as disclosed herein. In some examples, aspects of the operations of 1120 may be performed by a partition move manager 735 as described with reference to FIG. 7.

At 1125, the method may include transmitting, to the compute node, a mapping for the distributed volume indicating that the first partition is stored on the second node. The operations of 1125 may be performed in accordance with examples as disclosed herein. In some examples, aspects of the operations of 1125 may be performed by a mapping manager 740 as described with reference to FIG. 7.

Figure 12:
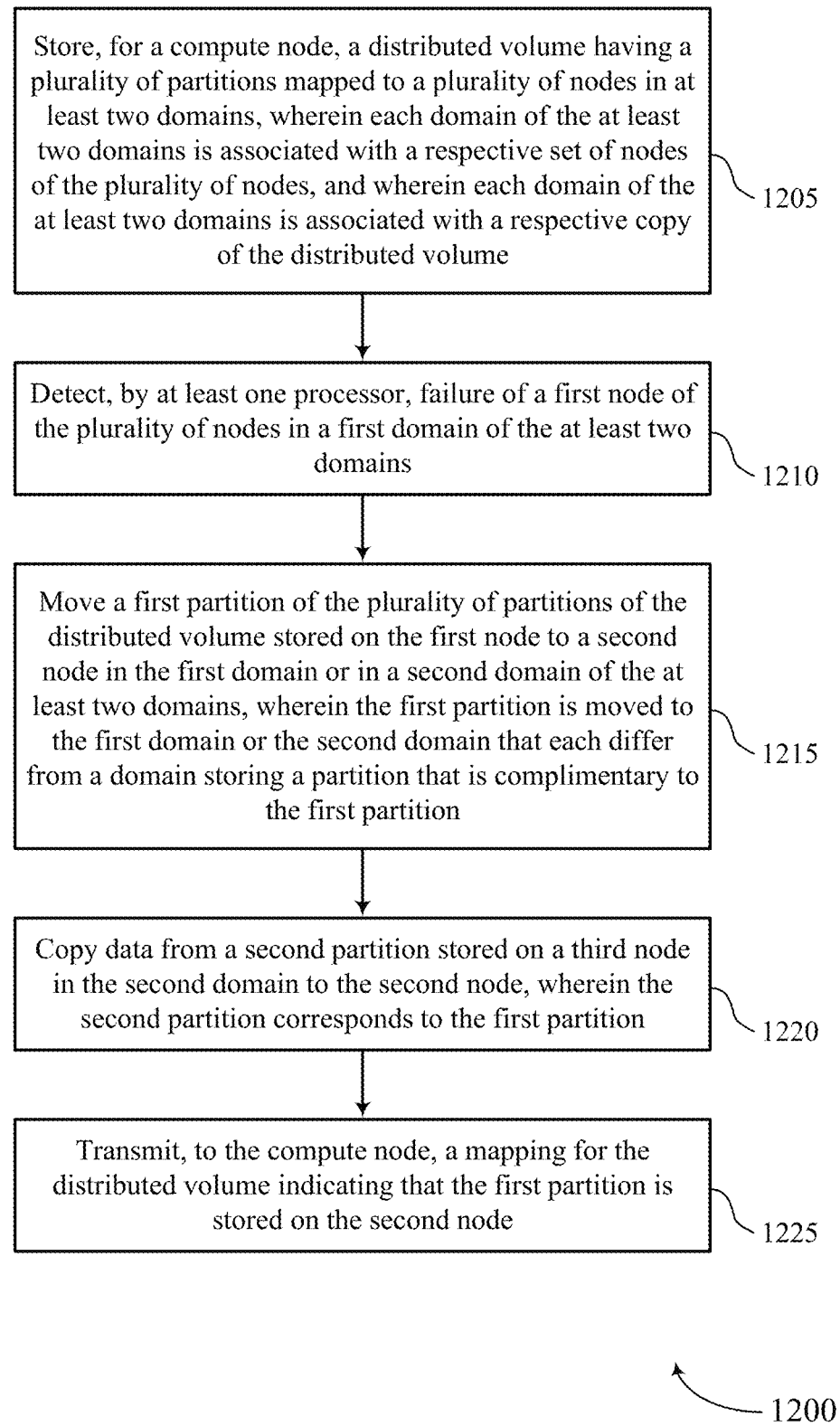

FIG. 12 shows a flowchart illustrating a method 1200 that supports data placement and recovery in the event of partition failures in accordance with aspects of the present disclosure. The operations of the method 1200 may be implemented by a Partition Manager or its components as described herein. For example, the operations of the method 1200 may be performed by a Partition Manager as described with reference to FIG. 1 through 8. In some examples, a Partition Manager may execute a set of instructions to control the functional elements of the Partition Manager to perform the described functions. Additionally, or alternatively, the Partition Manager may perform aspects of the described functions using special-purpose hardware.

At 1205, the method may include storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume. The operations of 1205 may be performed in accordance with examples as disclosed herein. In some examples, aspects of the operations of 1205 may be performed by a distributed volume manager 725 as described with reference to FIG. 7.

At 1210, the method may include detecting, by at least one processor, failure of a first node of the set of multiple nodes in a first domain of the at least two domains. The operations of 1210 may be performed in accordance with examples as disclosed herein. In some examples, aspects of the operations of 1210 may be performed by a failure detection manager 730 as described with reference to FIG. 7.

At 1215, the method may include moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition. The operations of 1215 may be performed in accordance with examples as disclosed herein. In some examples, aspects of the operations of 1215 may be performed by a partition move manager 735 as described with reference to FIG. 7.

At 1220, the method may include copying data from a second partition stored on a third node in the second domain to the second node, where the second partition corresponds to the first partition. The operations of 1220 may be performed in accordance with examples as disclosed herein. In some examples, aspects of the operations of 1220 may be performed by a partition move manager 735 as described with reference to FIG. 7.

At 1225, the method may include transmitting, to the compute node, a mapping for the distributed volume indicating that the first partition is stored on the second node. The operations of 1225 may be performed in accordance with examples as disclosed herein. In some examples, aspects of the operations of 1225 may be performed by a mapping manager 740 as described with reference to FIG. 7.

Figure 13:
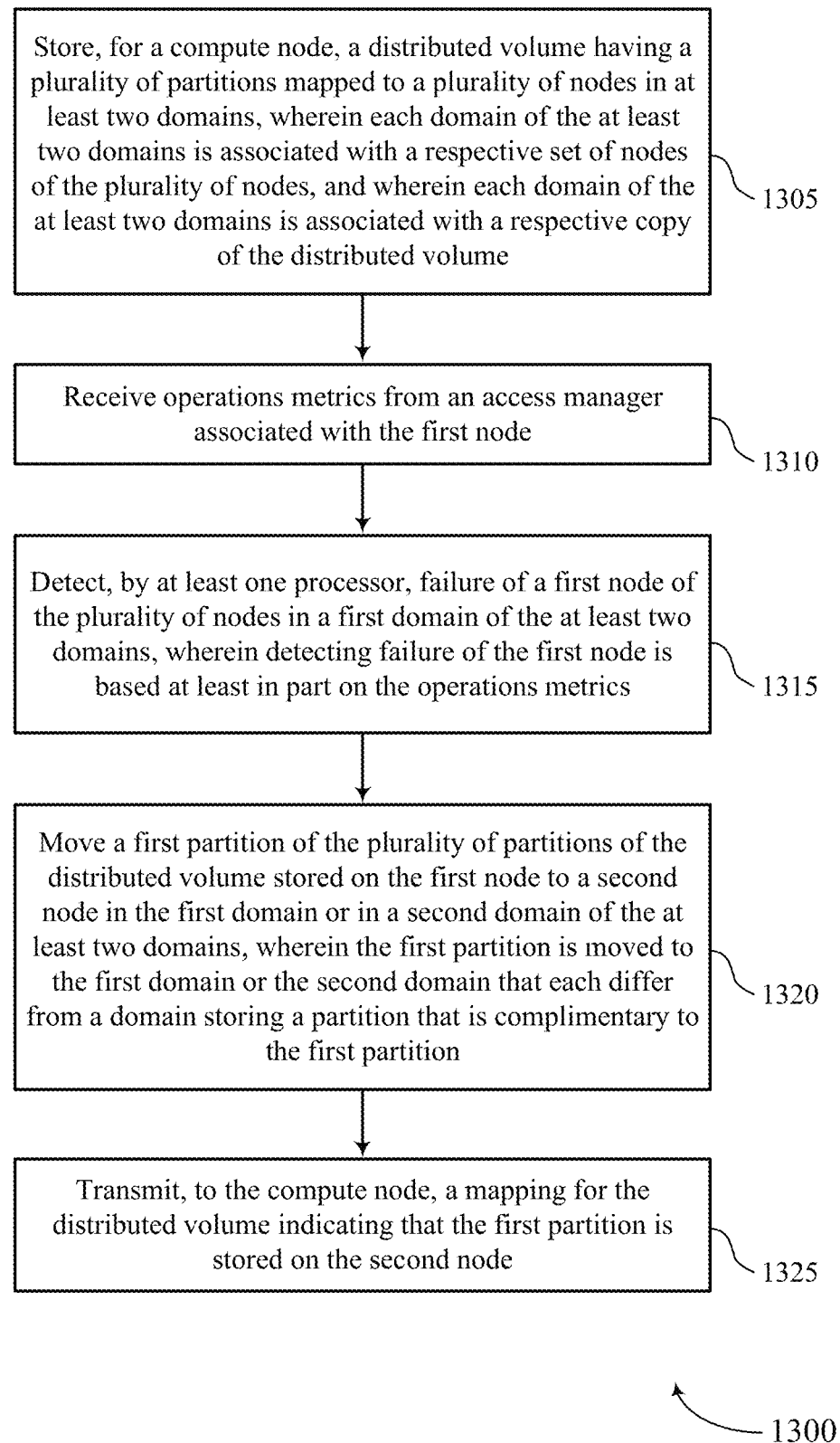

FIG. 13 shows a flowchart illustrating a method 1300 that supports data placement and recovery in the event of partition failures in accordance with aspects of the present disclosure. The operations of the method 1300 may be implemented by a Partition Manager or its components as described herein. For example, the operations of the method 1300 may be performed by a Partition Manager as described with reference to FIG. 1 through 8. In some examples, a Partition Manager may execute a set of instructions to control the functional elements of the Partition Manager to perform the described functions. Additionally, or alternatively, the Partition Manager may perform aspects of the described functions using special-purpose hardware.

At 1305, the method may include storing, for a compute node, a distributed volume having a set of multiple partitions mapped to a set of multiple nodes in at least two domains, where each domain of the at least two domains is associated with a respective set of nodes of the set of multiple nodes, and where each domain of the at least two domains is associated with a respective copy of the distributed volume. The operations of 1305 may be performed in accordance with examples as disclosed herein. In some examples, aspects of the operations of 1305 may be performed by a distributed volume manager 725 as described with reference to FIG. 7.

At 1310, the method may include receiving operations metrics from an access manager associated with the first node. The operations of 1310 may be performed in accordance with examples as disclosed herein. In some examples, aspects of the operations of 1310 may be performed by an operations metrics manager 755 as described with reference to FIG. 7.

At 1315, the method may include detecting, by at least one processor, failure of a first node of the set of multiple nodes in a first domain of the at least two domains, and where detecting failure of the first node is based on the operations metrics. The operations of 1315 may be performed in accordance with examples as disclosed herein. In some examples, aspects of the operations of 1315 may be performed by a failure detection manager 730 as described with reference to FIG. 7.

At 1320, the method may include moving a first partition of the set of multiple partitions of the distributed volume stored on the first node to a second node in the first domain or in a second domain of the at least two domains, where the first partition is moved to the first domain or the second domain that each differ from a domain storing a partition that is complementary to the first partition. The operations of 1320 may be performed in accordance with examples as disclosed herein. In some examples, aspects of the operations of 1320 may be performed by a partition move manager 735 as described with reference to FIG. 7.

At 1325, the method may include transmitting, to the compute node, a mapping for the distributed volume indicating that the first partition is stored on the second node. The operations of 1325 may be performed in accordance with examples as disclosed herein. In some examples, aspects of the operations of 1325 may be performed by a mapping manager 740 as described with reference to FIG. 7.

It should be noted that the methods described above describe possible implementations, and that the operations and the operations may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method comprising:
    storing, for a compute node, a distributed volume having a plurality of partitions mapped to a plurality of nodes in at least two domains, wherein each domain of the at least two domains is associated with a respective set of nodes of the plurality of nodes, and wherein each domain of the at least two domains is associated with a respective copy of the distributed volume;
    detecting, by at least one processor, failure of a first node of the plurality of nodes in a first domain of the at least two domains;
    moving a first partition of the plurality of partitions of the distributed volume stored on the first node to a second node in the first domain or in a second domain of the at least two domains, wherein the first partition is moved to the first domain or the second domain that each differ from a domain storing a partition that is complementary to the first partition;
    transmitting, to the compute node, an updated mapping for the distributed volume indicating that the first partition is stored on the second node; and
    receiving, from the compute node, a read or write command for data included in the first partition based on the updated mapping.

2. The method of claim 1, wherein moving the first partition to the second node comprises copying data from the first partition stored on the first node to the second node.

3. The method of claim 1, wherein moving the first partition to the second node comprises copying data from a second partition stored on a third node in the second domain to the second node, wherein the second partition corresponds to the first partition.

4. The method of claim 1, wherein detecting failure of the first node comprises receiving an indication of failure of the first node from a user interface.

5. The method of claim 1, further comprising receiving operations metrics from an access manager associated with the first node, and wherein detecting failure of the first node is based at least in part on the operations metrics.

6. The method of claim 5, wherein:
    the operations metrics comprise an amount of traffic associated with the first node, and
    detecting failure of the first node is based on the amount of traffic associated with the first node exceeding a threshold.

7. The method of claim 5, wherein:
    the operations metrics comprise a down time associated with the first node, and
    detecting failure of the first node is based on the down time associated with the first node exceeding a threshold.

8. An apparatus, comprising:
    a processor;
    memory coupled with the processor; and
    instructions stored in the memory and executable by the processor to cause the apparatus to perform operations comprising:
        storing, for a compute node, a distributed volume having a plurality of partitions mapped to a plurality of nodes in at least two domains, wherein each domain of the at least two domains is associated with a respective set of nodes of the plurality of nodes, and wherein each domain of the at least two domains is associated with a respective copy of the distributed volume;
        detecting failure of a first node of the plurality of nodes in a first domain of the at least two domains;
        moving a first partition of the plurality of partitions of the distributed volume stored on the first node to a second node in the first domain or in a second domain of the at least two domains, wherein the first partition is moved to the first domain or the second domain that each differ from a domain storing a partition that is complementary to the first partition;

transmitting, to the compute node, an updated mapping for the distributed volume indicating that the first partition is stored on the second node; and receiving, from the compute node, a read or write command for data included in the first partition based on the updated mapping.

9. The apparatus of claim 8, wherein the instructions to move the first partition to the second node further comprise copying data from the first partition stored on the first node to the second node.

10. The apparatus of claim 8, wherein the instructions to move the first partition to the second node further comprise copying data from a second partition stored on a third node in the second domain to the second node, wherein the second partition corresponds to the first partition.

11. The apparatus of claim 8, wherein the instructions to detect failure of the first node further comprise receiving an indication of failure of the first node from a user interface.

12. The apparatus of claim 8, the operations further comprising receiving operations metrics from an access manager associated with the first node, and wherein detecting failure of the first node is based at least in part on the operations metrics.

13. The apparatus of claim 12, wherein:
the operations metrics comprise an amount of traffic associated with the first node, and
detecting failure of the first node is based on the amount of traffic associated with the first node exceeding a threshold.

14. The apparatus of claim 12, wherein:
the operations metrics comprise a down time associated with the first node, and
detecting failure of the first node is based on the down time associated with the first node exceeding a threshold.

15. A non-transitory computer-readable medium storing code, the code comprising instructions executable by a processor to cause an apparatus to perform operations comprising:

storing, for a compute node, a distributed volume having a plurality of partitions mapped to a plurality of nodes in at least two domains, wherein each domain of the at least two domains is associated with a respective set of nodes of the plurality of nodes, and wherein each domain of the at least two domains is associated with a respective copy of the distributed volume;

detecting failure of a first node of the plurality of nodes in a first domain of the at least two domains;

moving a first partition of the plurality of partitions of the distributed volume stored on the first node to a second node in the first domain or in a second domain of the at least two domains, wherein the first partition is moved to the first domain or the second domain that each differ from a domain storing a partition that is complementary to the first partition;

transmitting, to the compute node, an updated mapping for the distributed volume indicating that the first partition is stored on the second node; and receiving, from the compute node, a read or write command for data included in the first partition based on the updated mapping.

* * * * *